(12) United States Patent
Kudukoli et al.

(10) Patent No.: US 7,159,183 B1
(45) Date of Patent: Jan. 2, 2007

(54) SYSTEM AND METHOD FOR PROGRAMMATICALLY CREATING A GRAPHICAL PROGRAM

(75) Inventors: Ram Kudukoli, Austin, TX (US); Robert Dye, Austin, TX (US); Melanie Jensen, Houston, TX (US); Yumiko Kawachi, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/518,492

(22) Filed: Mar. 3, 2000

Related U.S. Application Data

(60) Provisional application No. 60/149,942, filed on Aug. 19, 1999.

(51) Int. Cl.
*G06F 3/00* (2006.01)
(52) U.S. Cl. .................................... 715/762; 715/967
(58) Field of Classification Search ............... 709/203, 709/201, 202; 717/115, 109, 108, 105, 110, 717/111, 113; 715/762, 967, 853, 771, 966, 715/763, 704, 749
See application file for complete search history.

(56) References Cited

U.S. PATENT DOCUMENTS

| | | | |
|---|---|---|---|
| 4,831,580 A | 5/1989 | Yamada | 717/105 |
| 5,005,119 A | 4/1991 | Rumbaugh et al. | 718/101 |
| 5,742,504 A | 4/1998 | Meyer et al. | 700/83 |
| 5,767,853 A * | 6/1998 | Yoshida et al. | 715/839 |
| 5,784,275 A * | 7/1998 | Sojoodi et al. | 700/86 |
| 5,911,070 A | 6/1999 | Solton et al. | 717/105 |
| 5,966,532 A * | 10/1999 | McDonald | 717/105 |
| 6,053,951 A | 4/2000 | McDonald et al. | 717/109 |
| 6,298,474 B1 | 10/2001 | Blowers et al. | 717/104 |
| 6,366,300 B1 | 4/2002 | Ohara | 715/771 |
| 6,437,805 B1 * | 8/2002 | Sojoodi et al. | 345/763 |
| 6,453,464 B1 * | 9/2002 | Sullivan | 717/137 |
| 6,476,828 B1 * | 11/2002 | Burkett et al. | 345/760 |
| 6,526,566 B1 * | 2/2003 | Austin | 717/109 |
| 6,637,022 B1 | 10/2003 | Weeren et al. | 717/109 |

FOREIGN PATENT DOCUMENTS

EP 0 817 035 A2 1/1998

OTHER PUBLICATIONS

European search report for application number 00117301.2-2211, mailed Apr. 12, 2006.
"Lab VIEW™ User Manual"; National Instruments Corporation; Jan. 1998; pp. 2-1-2-23 and 22-1-2205; Austin, TX, U.S.A.
"Bridge VIEW™ and Lab VIEW™ G Programming Reference Manual"; National Instruments Corporation; Jan. 1998; pp. 21-1-21-11; Austin, TX, U.S.A.
Massimiliano Poletto, Wilson C. Hsieh, Dawson R. Engler and M Franks Kaashoek; "C ant tcc; A Language and Compiler for Dynamic Code Generation"; ACM Transactions on Programming Languages and Systems; Mar. 1999; pp. 324-369; vol. 21, No. 2.
Orlando Loques, Julius Leite and Enrique Vinicio Carrera E.; "P-Rio: A Modular Parallel-Programming Environment"; IEEE Concurrency; Jan.-Mar. 1998; pp. 47-56.

* cited by examiner

*Primary Examiner*—Kieu D. Vu
(74) *Attorney, Agent, or Firm*—Meyertons Hood Kivlin Kowert & Goetzel, P.C.; Jeffrey C. Hood; Jason L. Burgess

(57) ABSTRACT

A computer-implemented system and method for programmatically/dynamically creating or editing a graphical program. The ability to programmatically create/edit graphical programs enables applications and tools to automatically create or modify a graphical program or a portion of a graphical program. In the preferred embodiment, any operation which a user may perform while interactively editing a graphical program (e.g., connect two objects, change the position of an object, change the color of an object, etc.) may be performed programmatically.

97 Claims, 25 Drawing Sheets

Open Application Reference Node

Open VI Reference Node

New VI Reference Node

Open VI Object Reference Node

New VI Object Reference Node

Upcast Reference Node

Downcast Reference Node

Close Application or VI Reference Node

Call By Reference Node

Property Node

Figure 21 Front Panel Refnum controls

Server Configuration
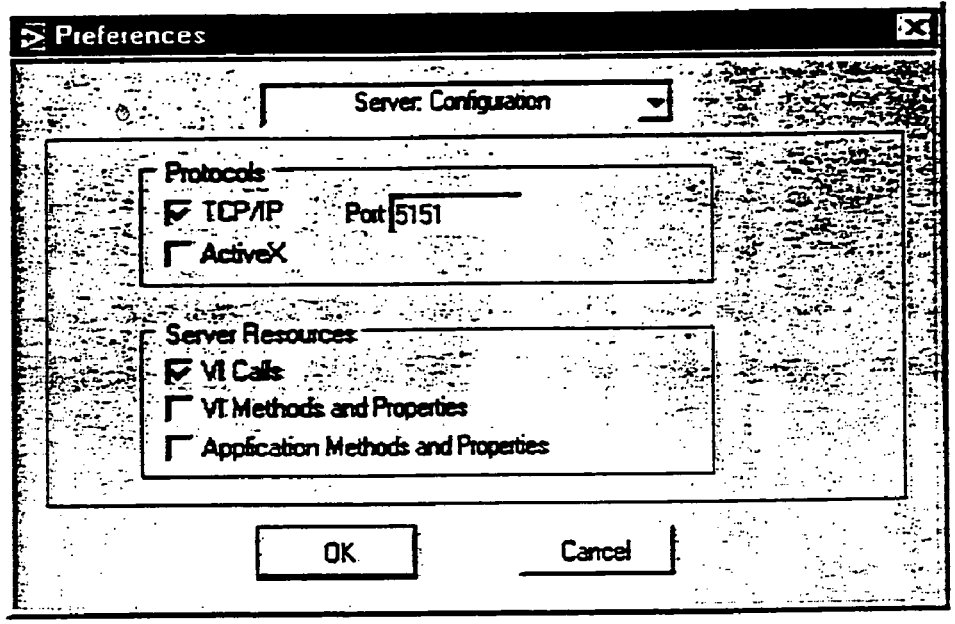
Figure 28 Server Configuration Dialog Box
Exported VIs Configuration
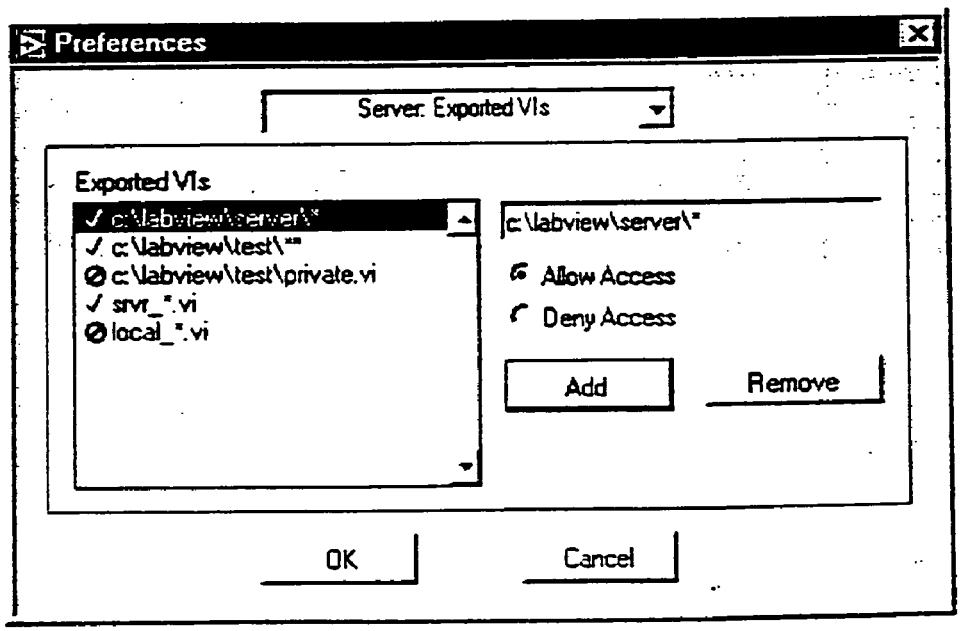
Figure 29 Server: TCP/IP Access Dialog Box

TCP/IP Access Configuration
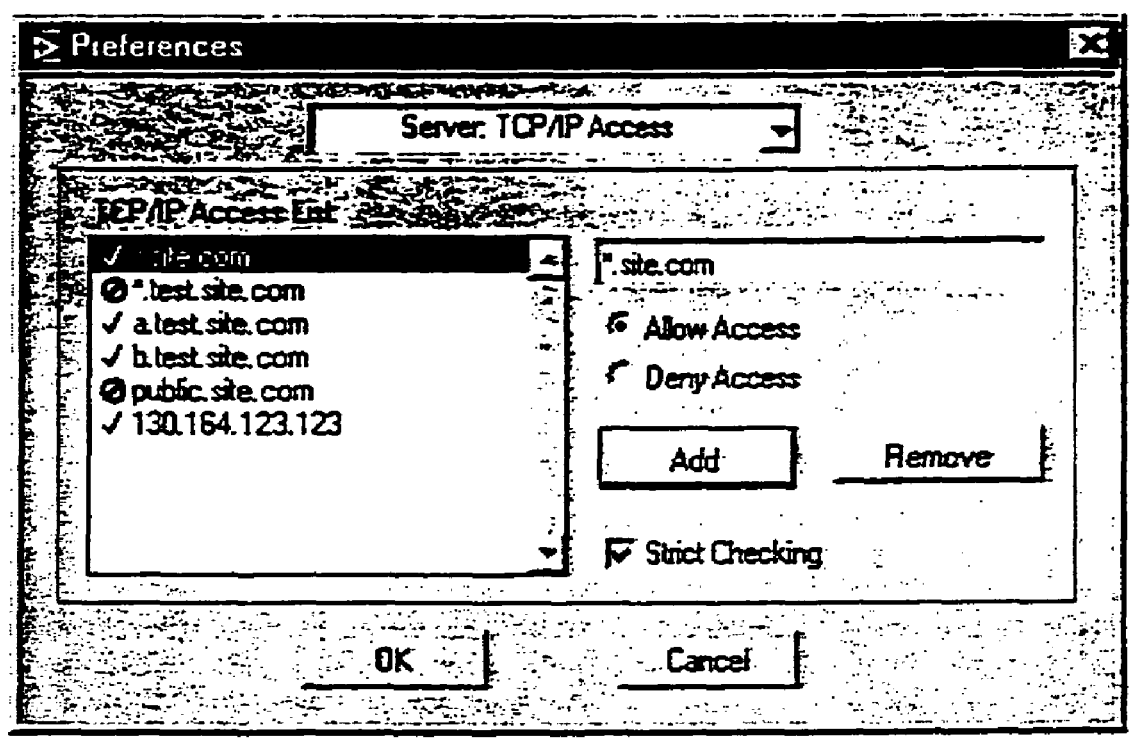
Figure 30 Server: TCP/IP Access

SYSTEM AND METHOD FOR PROGRAMMATICALLY CREATING A GRAPHICAL PROGRAM

PRIORITY CLAIM

This application claims benefit of priority of U.S. provisional application Ser. No. 60/149,942 titled "System and Method for Programmatically Creating a Graphical Program", filed Aug. 19, 1999, whose inventors were Robert Dye, Melanie Jensen, Ram Kudukoli, Yumiko Kawachi.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to the field of graphical programming, and in particular to a system and method for programmatically creating a graphical program.

DESCRIPTION OF THE RELATED ART

Traditionally, high level text-based programming languages have been used by programmers in writing applications programs. Many different high level text-based programming languages exist, including BASIC, C, FORTRAN, Pascal, COBOL, ADA, APL, etc. Programs written in these high level languages are translated to the machine language level by translators known as compilers or interpreters. The high level text-based programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, industrial automation, and simulation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered the highest and most intuitive way in which to interact with a computer. A graphically based programming environment can be represented at a level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, data structures may be automatically constructed which characterize an execution procedure which corresponds to the displayed procedure. The graphical program may be compiled or interpreted by a computer using these data structures. Therefore, a user can create a computer program solely by using a graphically based programming environment. This graphically based programming environment may be used for creating virtual instrumentation systems, industrial automation systems, modeling processes, and simulation, as well as for any type of general programming.

Therefore, Kodosky et al teaches a graphical programming environment wherein a user places or manipulates icons in a block diagram using a block diagram editor to create a data flow "program.". A graphical program for controlling or modeling devices, such as instruments, processes or industrial automation hardware, is referred to as a virtual instrument (VI). In creating a virtual instrument, a user may create a front panel or user interface panel. The front panel includes various front panel objects, such as controls or indicators, that represent or display the respective input and output that will be used by the graphical program or VI, and may include other icons which represent devices being controlled. When the controls and indicators are created in the front panel, corresponding icons or terminals may be automatically created in the block diagram by the block diagram editor. Alternatively, the user can place terminal icons or input/output blocks in the block diagram which may later cause the display of corresponding front panel objects in the front panel, either at edit time or at run time.

During creation of the graphical program, the user selects various functions that accomplish his desired result and connects the function icons together. For example, the functions may be connected in a data flow and/or control flow format. The functions may be connected between the terminals of the respective controls and indicators. Thus the user creates or assembles a data flow program, referred to as a block diagram, representing the graphical data flow which accomplishes his desired function. The assembled graphical program may then be compiled or interpreted to produce machine language that accomplishes the desired method or process as shown in the block diagram.

A user may input data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, and machine vision applications, among others.

As graphical programming environments mature and grow in popularity and complexity, it becomes increasingly desirable to provide high-level tools which help a user create or edit a graphical program. It also becomes increasingly desirable to integrate graphical programming environments with other applications and programming environments. In many cases, the desired tools or the desired integration with other applications requires an ability to dynamically or programmatically generate or edit a graphical program or a portion of a graphical program.

As described above, a user typically creates a graphical program within a graphical programming environment by interactively or manually placing icons or nodes representing the desired blocks of functionality on a diagram, and connecting the icons/nodes together to represent the data flow of the program. The ability to programmatically create/edit graphical programs enables a graphical program to automatically be created/edited without this type of interactive user intervention. A system and method for programmatically creating/editing graphical programs is described herein.

SUMMARY OF THE INVENTION

The present invention comprises a computer-implemented system and method for programmatically/dynamically creating or editing a graphical program. The ability to programmatically create/edit graphical programs enables applications and tools to automatically create or modify a graphical program or a portion of a graphical program. In the preferred embodiment, any operation which a user may perform while interactively assembling or editing a graphical program (e.g., connect two objects, change the position of an object, change the color of an object, etc.) may be performed programmatically.

This programmatic capability enables tools such as interactive wizards to simplify, quicken, or automate the creation or editing of graphical programs. For example, an interactive wizard tool may present a series of user interface dialogs to a user, collect information from the user, and use the collected information to dynamically generate or edit a corresponding graphical program. Such wizard tools may be included in a third-party application. For example, the National Instruments IMAQ Vision Builder application dynamically generates graphical programs for analyzing images, based on user-provided information. Various other types of tools or applications may also create or edit graphical programs. For example, a program translator may dynamically create a graphical program from a text-based program, such as a C language program.

To simplify the process of dynamically creating/editing a graphical program, an application programming interface (API) is provided which programs may call. Programs that call the API to programmatically create/edit a graphical program are referred to herein as client programs. A client program may be a text-based program which invokes functions/methods exposed by the API. A client program may also be another graphical program which includes particular nodes for using the API. The API may include functions/methods/nodes to create a new graphical program, add a new object to a graphical program, obtain a reference to a graphical program object, get/set a property of a graphical program object, invoke a method on a graphical program object, etc.

The functions/methods/nodes of the API are implemented by any of various types of application programs or software components. For example, a graphical programming environment may include server functionality so that a client program may utilize a communication protocol to directly interface with the graphical programming environment. The communication protocol may utilize any of various types of protocols. In one embodiment, the National Instruments LabVIEW graphical programming environment implements a communication protocol based on the TCP/IP standard protocol, using a particular port number (e.g., port number 3363) which is formally registered with the Internet Assigned Numbers Authority.

Client programs may be constructed which "know" the correct protocol for interfacing with a graphical programming environment, e.g., the client programs may be tightly integrated with the graphical programming environment. For example, a client program may be a graphical program running in one instance of the graphical programming environment, and the client may interface with another instance of the graphical programming environment, such as an instance running on a remote machine. As other examples, the client program may be a graphical program created by the graphical programming environment, or the client program may be an application tightly associated with the graphical programming environment, such as an add-on toolkit.

Client programs may also use various distributed or component-based software models to invoke the functions/methods/nodes of the API. For example, in one embodiment the graphical programming environment encapsulates a portion of its functionality as an ActiveX object which provides the ability to programmatically create/edit graphical programs. Client programs may use the ActiveX/DCOM programming model to obtain a reference to the ActiveX object and invoke methods of the API. The ActiveX object may communicate with a graphical programming environment which creates/edits the graphical program, or the ActiveX object may itself include the functionality to create/edit the graphical program. Software components based on other models or architectures may also be exposed for use by client programs. For example, client programs may call the API through a CORBA component, a Java component using RMI, etc.

As noted above, the program which calls the API in order to automatically create or edit a graphical program is referred to herein as the client program. The program which performs the create/edit operations on the graphical program is referred to herein as the server program. If the client calls the API through an object such as an ActiveX object, this object is referred to as the proxy component. However, it is noted that these divisions may be conceptual only and/or may not correspond to how these terms are used elsewhere. For example, the client program and the server program may reside on the same machine.

BRIEF DESCRIPTION OF THE DRAWINGS

A better understanding of the present invention can be obtained when the following detailed description of the preferred embodiment is considered in conjunction with the following drawings, in which:

FIGS. 28–30 illustrate dialog boxes for configuring one embodiment of a server program.

Figure 1:
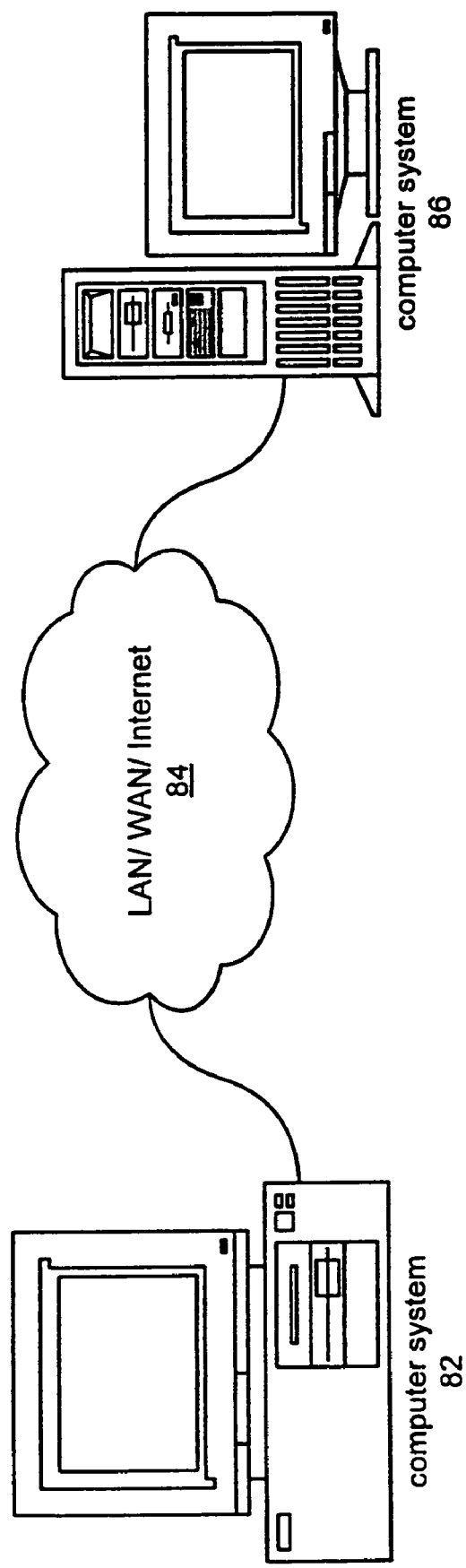
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference

The following references are hereby incorporated by reference in their entirety as though fully and completely set forth herein.

U.S. patent application Ser. No. 08/810,079 titled "System and Method for Developing Automation Clients Using a Graphical Data Flow Program" filed Mar. 4, 1997, which has issued as U.S. Pat. No. 6,064,812.

U.S. patent application Ser. No. 08/916,005 titled "System and Method for Providing Client/Server Access to Graphical Programs" filed Aug. 21, 1997, which has issued as U.S. Pat. No. 6,102,965.

U.S. patent application Ser. No. 09/136,123 titled "System and Method for Accessing Object Capabilities in a Graphical Program" filed Aug. 18, 1998, which has issued as U.S. Pat. No. 6,437,805.

For general information on object oriented programming concepts, please see Booch, Object-Oriented Analysis and Design with Applications, The Benjamin/Cummings Publishing Company, Inc., 1994 which is hereby incorporated by reference in its entirety.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

The computer system 82 includes or stores a client computer program that programmatically creates or edits a graphical program or a portion of a graphical program. As described above, the client program may use an API to call a server program, such as a graphical programming environment application, which performs the actual operations of creating or editing the graphical program. The server program may reside on the computer system 82 or on the second computer system 86. The client program may interface with the server program indirectly through a proxy component, such as an ActiveX component. The proxy component may reside on the computer system 82 or on the second computer system 86 or on a third computer system connected to the network 84.

The client, server, and proxy software programs/components may be implemented in any of various ways, including procedure-based techniques, component-based techniques, and/or object-oriented techniques, among others. The programs may be written using any combination of text-based or graphical programming languages. Also, the programs may be written using distributed modules or components so that each of the client, server, and proxy may reside on any combination of computer system 82, computer system 86, and other computer systems connected to the network 84.

Figure 2A:
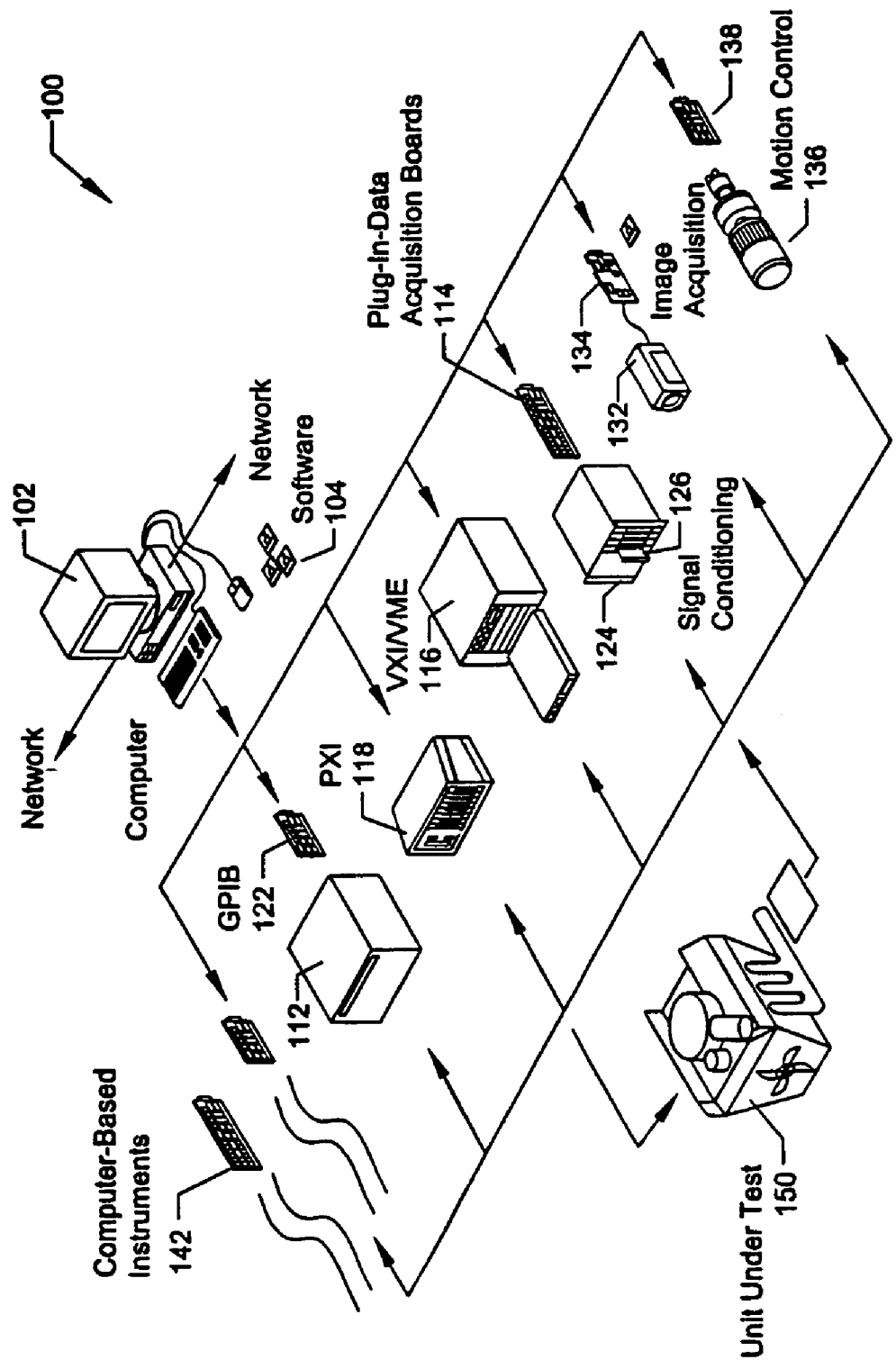
FIGS. 2A and 2B illustrate representative instrumentation and process control systems including various I/O interface options.
Figure 2B:
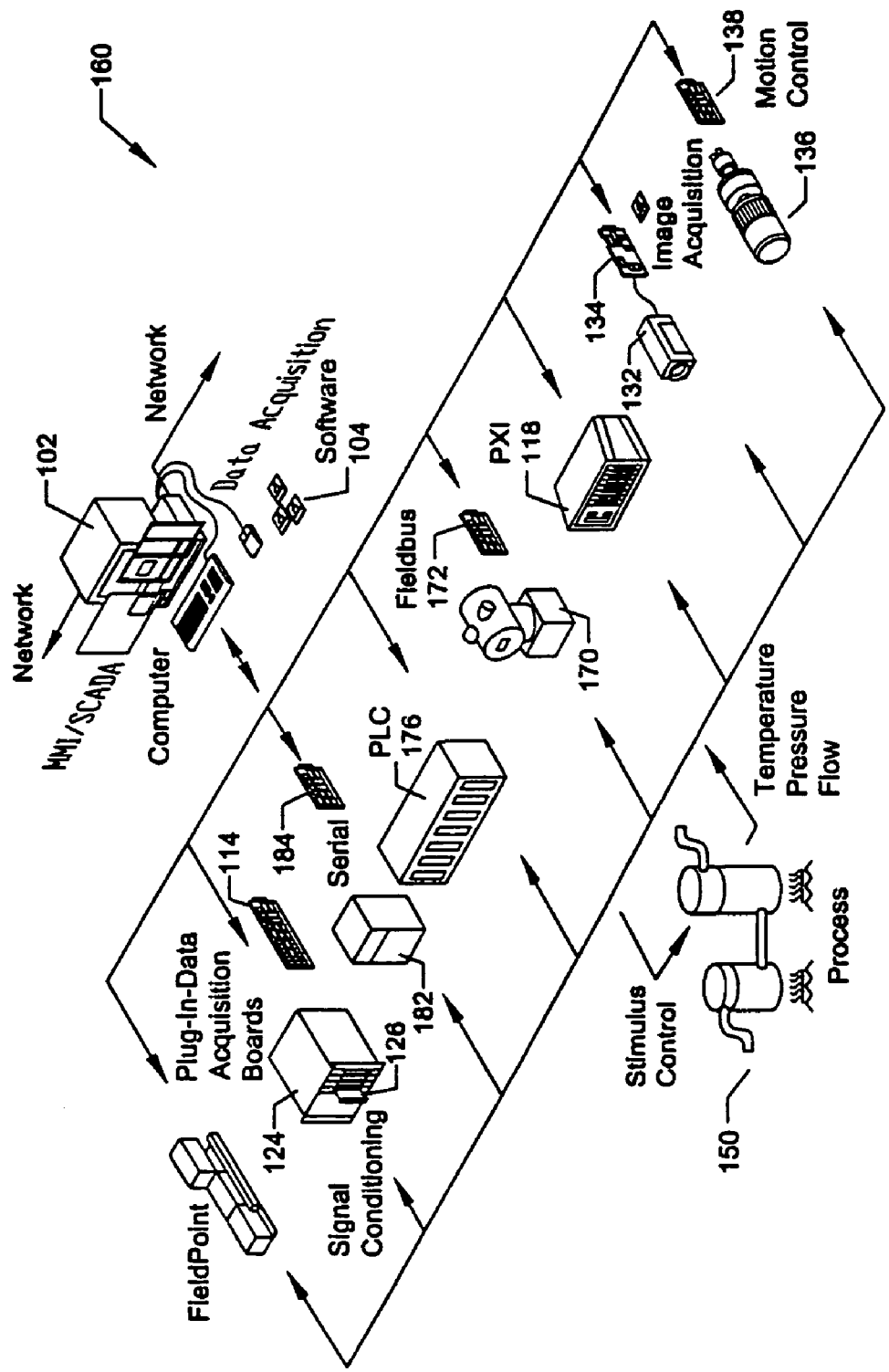

FIGS. 2A and 2B—Instrumentation and Industrial Automation Systems

FIGS. 2A and 2B illustrate exemplary systems which may store or use client/server/proxy programs for programmatically creating/editing graphical programs for instrumentation, process control, or other purposes. These programs may of course be stored in or used by other types of systems as desired.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 connects through the one or more instruments to analyze, measure, or control a unit under test (UUT) or process 150. The host computer 102 may store client, server, and/or proxy computer programs or components for programmatically creating or editing a graphical program, such as a graphical program which interacts with or controls the one or more instruments. In other words, the computer 102 may be either of computers 82 or 86.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may store client, server, and/or proxy computer programs or components for programmatically creating or editing a graphical program, such as a graphical program that is involved with the automation function performed by the automation system 160. In other words, the computer 102 may be either of computers 82 or 86.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention are stored. The term "memory medium" is intended to include an installation medium, e.g., a CD-ROM, floppy disks 104, or tape device, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the client program, server program, and/or the resulting graphical program that is created or edited are designed for data acquisition/generation, analysis, and/or display, and for controlling or modeling instrumentation or industrial automation hardware. For example, in the preferred embodiment, the server program is the National Instruments LabVIEW graphical programming environment application, which provides specialized support for developers of instrumentation applications. The client program may also be a program involved with instrumentation or data acquisition.

However, it is noted that the present invention can be used for a plethora of applications and is not limited to instrumentation or industrial automation applications. In other words, FIGS. 2A and 2B are exemplary only, and graphical programs for any of various types of purposes may be generated or edited by client/server/proxy programs for any of various types of purposes, where the client/server/proxy prrograms are stored in and execute on any of various types of systems. For example, a spreadsheet program may act as a client program and may use the API described herein to dynamically generate a graphical program which analyzes spreadsheet data and displays the results of the analysis to a user.

Figure 3:
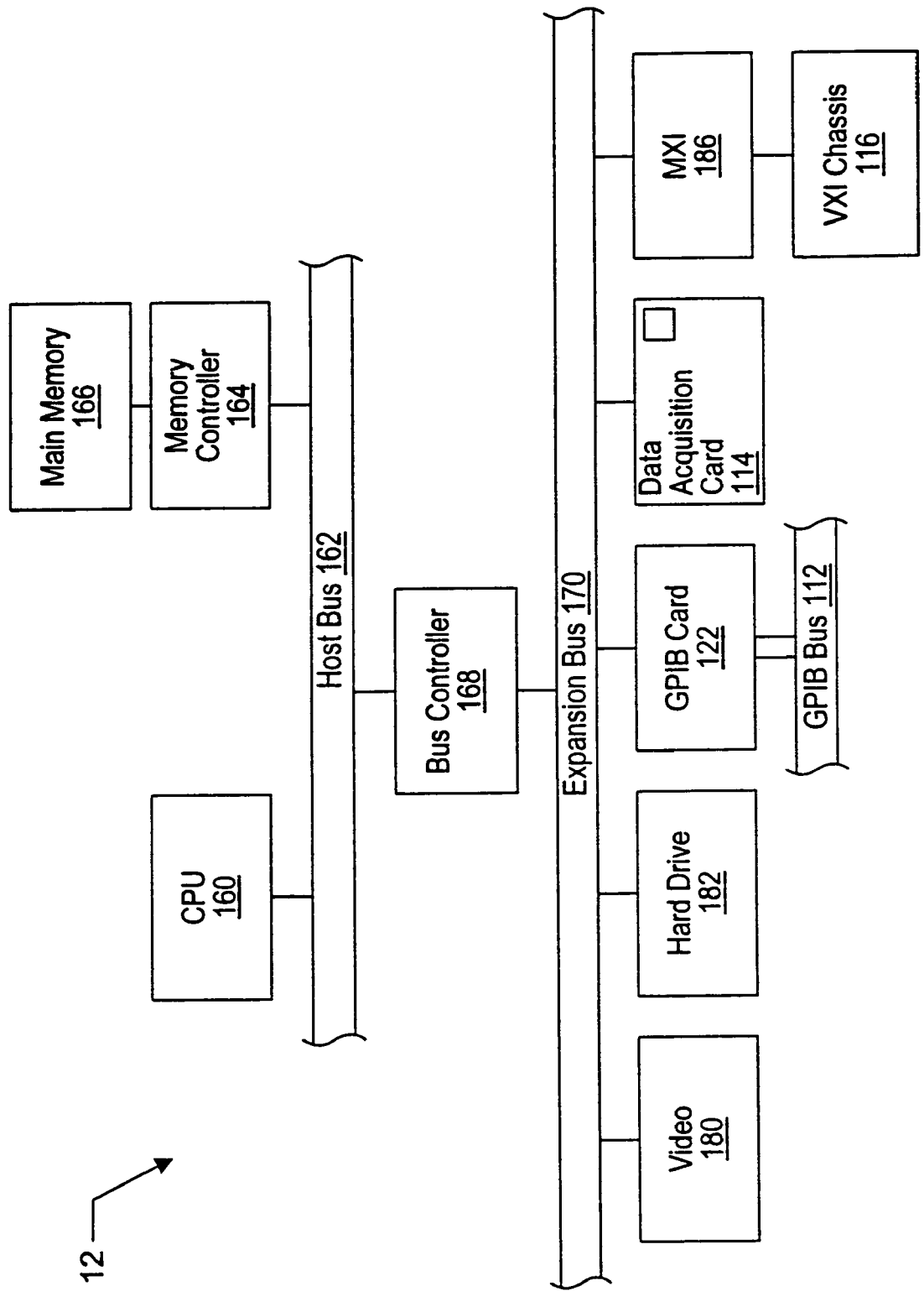
FIG. 3 is a block diagram of the computer system of FIGS. 1, 2A and 2B.

FIG. 3—Computer System Block Diagram

FIG. 3 is a block diagram of the computer system illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 4:
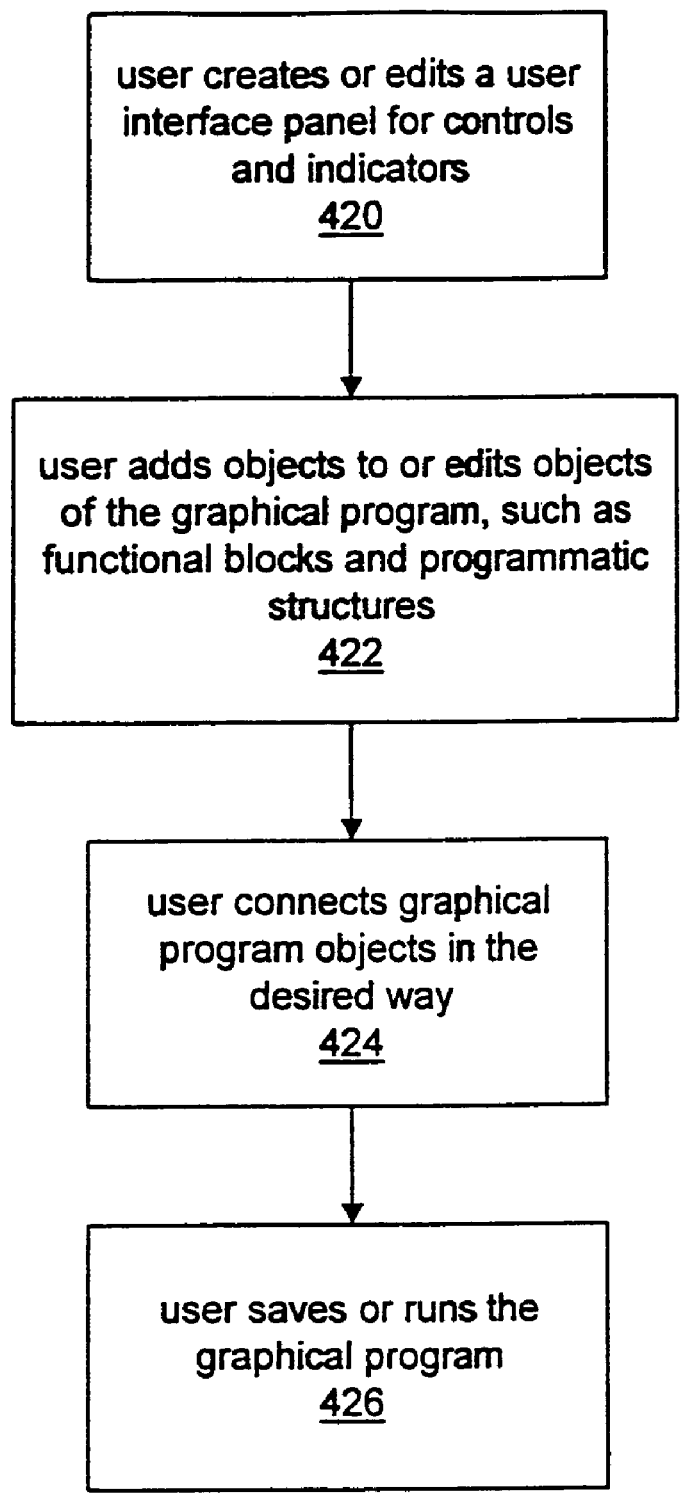
FIG. 4 is a flowchart diagram illustrating interactive creation or editing of a graphical program.
Figure 5:
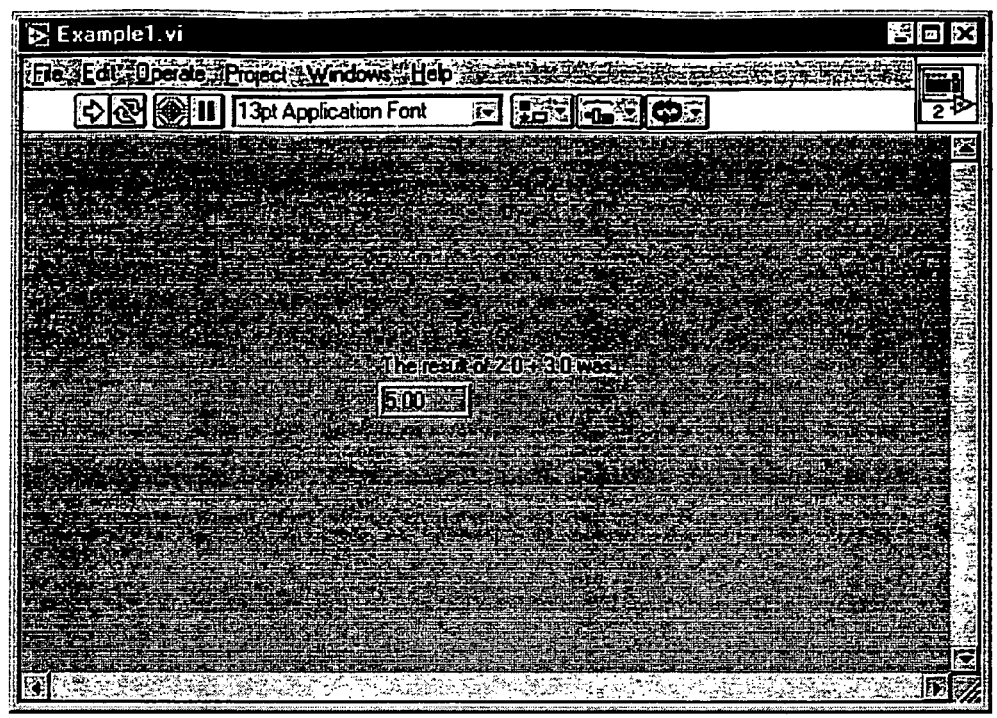
FIGS. 5 and 6 illustrate a simple graphical program comprising a user interface panel and a block diagram.
Figure 6:
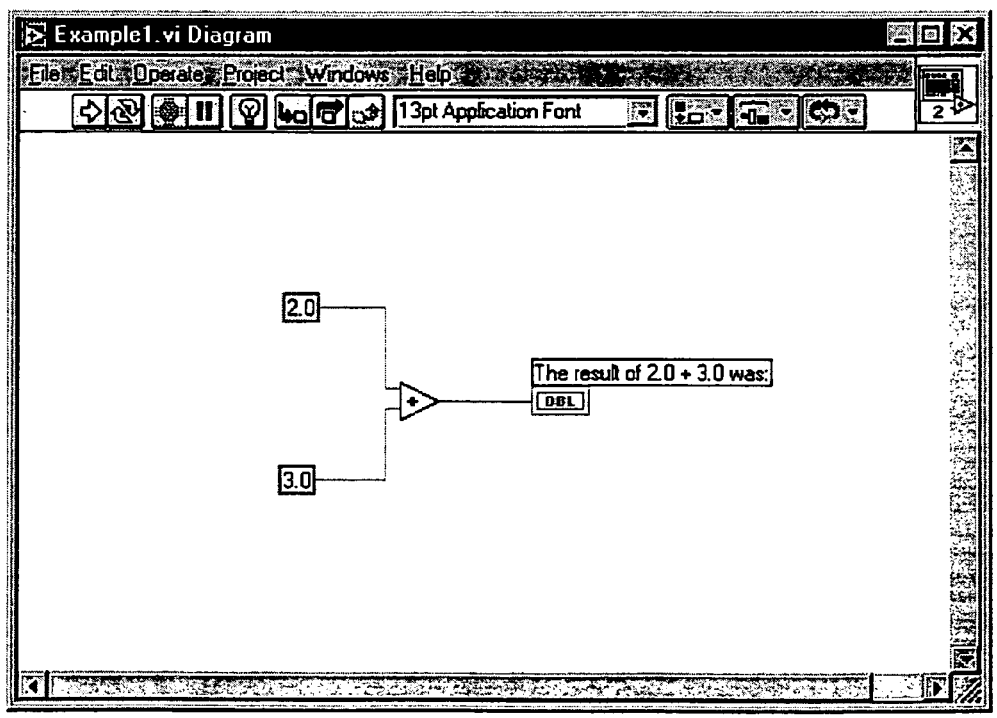

FIGS. 4—6: Interactive Creation of a Graphical Program by a User

FIG. 4 is a flowchart diagram illustrating one embodiment of how a user may interactively or manually create or edit a graphical program. As shown in the flowchart and described below, the user manually adds various objects to a graphical program, connects them together, etc. In contrast, the present invention comprises a system and method for programmatically creating or editing a graphical program without requiring this type of user interaction.

In the embodiment shown in FIG. 4, the steps are performed by a user creating or editing a graphical program in a graphical programming environment. As shown, in step 420 the user may create or edit a user interface panel for displaying a graphical user interface. The user interface panel may comprise controls for accepting user input, displaying information such as program output, or both. For example, the user interface panel may include buttons, selectable lists, text boxes, graph controls, images, etc. A user may "drop" various controls or other objects onto the user interface panel, e.g., by selecting the desired control from a control palette. FIG. 5 illustrates a simple user interface panel. Step 420 is not necessarily performed. For example, a user interface panel may not be desired, a user interface panel may be inherently specified during creation of the block diagram, or a user interface panel may automatically be created as the user creates the executable portions of the graphical program.

A graphical program may include a block diagram comprising objects referred to herein as "nodes" which are connected together to model the program execution logic and data flow or control flow. A block diagram node may be displayed as an icon representing the type or functionality of the node. FIG. 6 illustrates a simple block diagram. As a user adds objects to the user interface panel, the graphical programming environment may automatically create a corresponding object on the block diagram. Such block diagram nodes which correspond to user interface panel objects are referred to herein as user interface nodes. For example, the FIG. 6 block diagram node labeled "The result of 2.0+3.0 was:" is a user interface node corresponding to the FIG. 5 user interface output indicator. User interface nodes may be connected with other objects or nodes in the block diagram to participate in the program logic and data/control flow. User interface nodes may map input/output between a user interface panel and a block diagram. For example, the user interface node in FIG. 6 receives data and displays the data in the corresponding user interface indicator in FIG. 5.

In step 422 of FIG. 4, the user adds other objects/nodes to or edits other objects/nodes of the graphical program. These objects or nodes may include function nodes which perform predefined functional operations such as numeric functions, Boolean functions, string functions, array functions, error functions, file functions, application control functions, etc. For example the block diagram shown in FIG. 6 uses an addition function node to add two constants together. In step 422 the user may also add other types of nodes to the graphical program. For example, nodes may be added which represent numeric constants. FIG. 6 illustrates numeric constant nodes representing the floating point constants 2.0 and 3.0.

Other types of nodes which may be added include subprogram nodes for calling a graphical subprogram, global or local variable nodes for defining and using variables, etc. In step 422, the user may also add other types of objects to the graphical program. For example, objects representing programmatic structures such as for loops, while loops, case structures, etc. may be added. The user may add nodes and other types of objects to a graphical program in various ways, e.g., by selecting a node or object from a palette that displays icons representing the various nodes and objects.

An API which enables a program to programmatically create or edit a second graphical program is described in detail below. In one embodiment, a graphical program may use the API by incorporating specialized nodes to create or open a graphical program, add objects to or edit objects of a graphical program, etc. These specialized nodes are described below.

In step 424 of FIG. 4, the user connects or "wires" the graphical program objects in order to achieve the desired executable logic and data flow or control flow. For example the objects may include input and output terminals, and the user may connect the output terminal of one node to the input terminal of another node, etc. FIG. 6 illustrates one embodiment of how objects may be connected. In this example, output terminals of the two numeric constant nodes are connected to the input terminals of an addition function node. The addition function node performs the addition operation on the numeric input. The output terminal of the addition function node is connected to the input of the user interface indicator node so that the result of the addition operation is displayed in the user interface panel shown in FIG. 5.

Programmatic structure objects may also include terminals which integrate them with the other objects of the graphical program. For example, a while loop may comprise a condition terminal to which an output terminal of a node supplying a boolean value may be connected to signify when the loop should end.

In step 426 of FIG. 4, the user saves or runs the graphical program. The graphical program may be saved in any of various formats. For example, a tree of data structures may be built which represents the various elements of the graphical program and the relationships among the elements, and the data structures may be saved in a binary or text format. If the graphical program includes user interface panels, these panels may also be saved. In step 426 the user may also execute the graphical program. The user may run the graphical program in any of various ways. For example, a graphical programming environment may allow a program to be run from within the development environment, or the user may create a standalone program and run the program, etc.

It is noted that steps 420 through 426 typically occur in an iterative manner and typically occur in various orders. For example a user may add a user interface control to a user interface panel, then connect a user interface node corresponding to the control to another node, then add and connect a function node to the program, then run the program to test it, then change the way a node is connected, etc. Thus, the flowchart of FIG. 4 is exemplary, and various steps may be combined, omitted, added, or modified as required or desired for developing different graphical programs or using different embodiments of graphical program development environments.

Also, FIG. 4 illustrates one embodiment of how a user may create/edit a graphical program, and the process may differ for other embodiments. As described above, a client program, which may be a graphical program, may interface with a server program, directly or through a proxy program or component, in order to programmatically create or edit a graphical program. The server program may be a graphical programming environment operable to respond to the client program's requests for creating/editing the graphical program. In the preferred embodiment, the graphical programming environment is the LabVIEW graphical programming environment available from National Instruments. For more information on the LabVIEW graphical programming environment and its abilities to create graphical programs and communicate with client programs, please refer to the LabVIEW system documentation available from National Instruments, as well as the patent applications incorporated by reference above.

Figure 7:
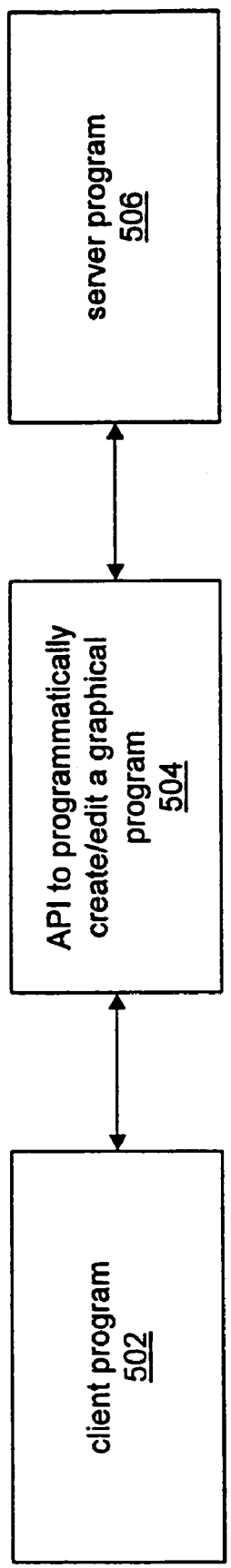
FIG. 7 is a block diagram illustrating the abstract relationship between a client program, an API to programmatically create/edit a graphical program, and a server program.

FIG. 7—Client Program Accesses Server Program Through an API

FIG. 7 is a block diagram illustrating the abstract relationship between a client program 502, an API 504 to programmatically create/edit a graphical program, and a server program 506. As noted above, the client program 502 may be any of various types of programs. For example, the client program 502 may be a graphical program. The client program 502 may also be a text-based program such as a C++ program, a Visual Basic program, a Java program, etc., or any combination of these or other languages. The client program 502 may execute independently or may execute within an execution subsystem of an application development environment.

The client program 502 may call the API 504 in any of various ways. For example, a client graphical program may include graphical nodes corresponding to the API 504. One embodiment of a set of graphical nodes which a client graphical program may utilize to create/edit a graphical program is described in detail below. A client graphical program may also interface with text-based code which calls the API 504. For example, the client graphical program may be a LabVIEW graphical program which includes code interface nodes.

The client program 502 may call the API 504 in various other ways. For example, the server program 506 may expose a component such as an ActiveX component, CORBA component, JavaBeans component, etc., and the client program 502 may obtain a reference to the object to invoke functions or methods of the API 504. The API 504 may also be integrated with the language or development environment of the client program 502, e.g. as a library.

Through the API 504, the client program 502 communicates with a server program 506. The server program 506 is operable to perform the actions indicated by the API. For example, the server program may be operable to create a new graphical program, add objects to the graphical program, connect graphical program objects, etc. The server program 506 is preferably an instance of a graphical programming environment. In the preferred embodiment, the server program 506 is an instance of the LabVIEW graphical programming environment.

FIG. 7 illustrates the abstract relationship between the client program 502, the API 504, and the server program 506. In actual embodiments, various layers may exist which implement the elements of the FIG. 7 relationship. For example, the client program 502 may be a part of a larger software application, the server program 506 may receive information sent by the client program via an intermediate server, etc.

Figure 8:
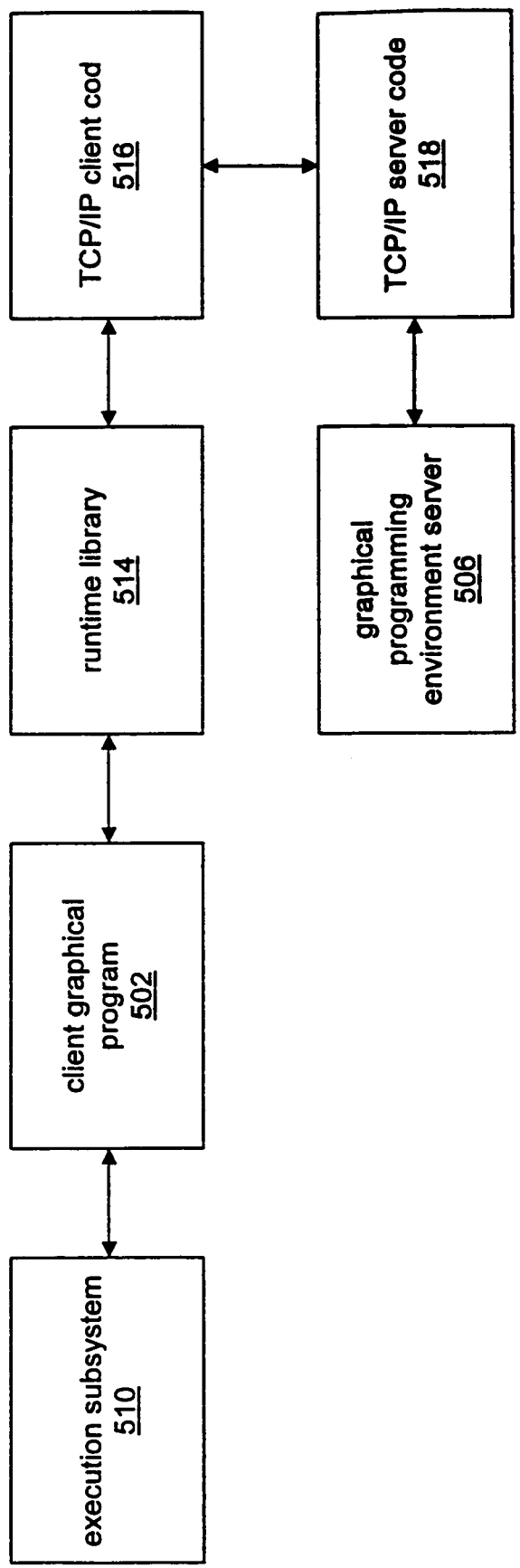
FIG. 8 illustrates an embodiment of the client/server relationship of FIG. 7 in which the client program is a graphical program, and the server program is an instance of a graphical programming environment application.

FIG. 8—Client Graphical Program Accesses Graphical Programming Environment

FIG. 8 illustrates one embodiment of the client/server relationship of FIG. 7. In the embodiment of FIG. 8, the client program 502 is a graphical program, and the server program 506 is an instance of a graphical programming environment application. The client graphical program 502 may execute independently or may execute within an execution subsystem 510, such as an execution subsystem of a graphical programming environment. The client graphical program 502 may be a graphical program created using the same graphical programming environment as the graphical programming environment server 506. For example, the client graphical program 502 may be a LabVIEW graphical program, and the server program 506 may be a LabVIEW application.

The client graphical program 502 utilizes the API 504 of FIG. 7 to communicate with the graphical programming environment server 506. For example, the client graphical program 502 may include graphical nodes which request the graphical programming environment 506 to open a graphical program, edit objects of the graphical program, etc. The functionality of the API 504 may be implemented in various ways. In the example of FIG. 8, the client graphical program 512 interfaces with a runtime library 514 which includes code corresponding to the API nodes. In other embodiments, the graphical program may interface with other types of software components which implement the API, such as ActiveX, CORBA, or JavaBeans components.

The client graphical program 502 may execute in a different location than the graphical programming environment server 506. The client and server programs may communicate using any of various types of protocols, such as the TCP/IP network protocol. As shown in FIG. 8, the runtime library 514 may include TCP/IP client code 516, and the graphical programming environment server 506 may include TCP/IP server code 518. The TCP/IP server code 518 may listen for requests from TCP/IP client code 516. Once a connection is established, the client code 516 and server code 518 may exchange messages using a message protocol.

The block diagram of FIG. 8 illustrates an architecture in which the client program 502 communicates with a server program 506 via a defined protocol. Thus, both the client program and the server program must know the required communications protocol. In the preferred embodiment of FIG. 8, the client graphical program 502 is a LabVIEW graphical program, and the server program 506 is a LabVIEW application instance. In this embodiment, the LabVIEW client program may include certain nodes, such as the nodes described below, for communicating with the LabVIEW application server and causing the LabVIEW application server to create/edit a graphical program.

Figure 9:
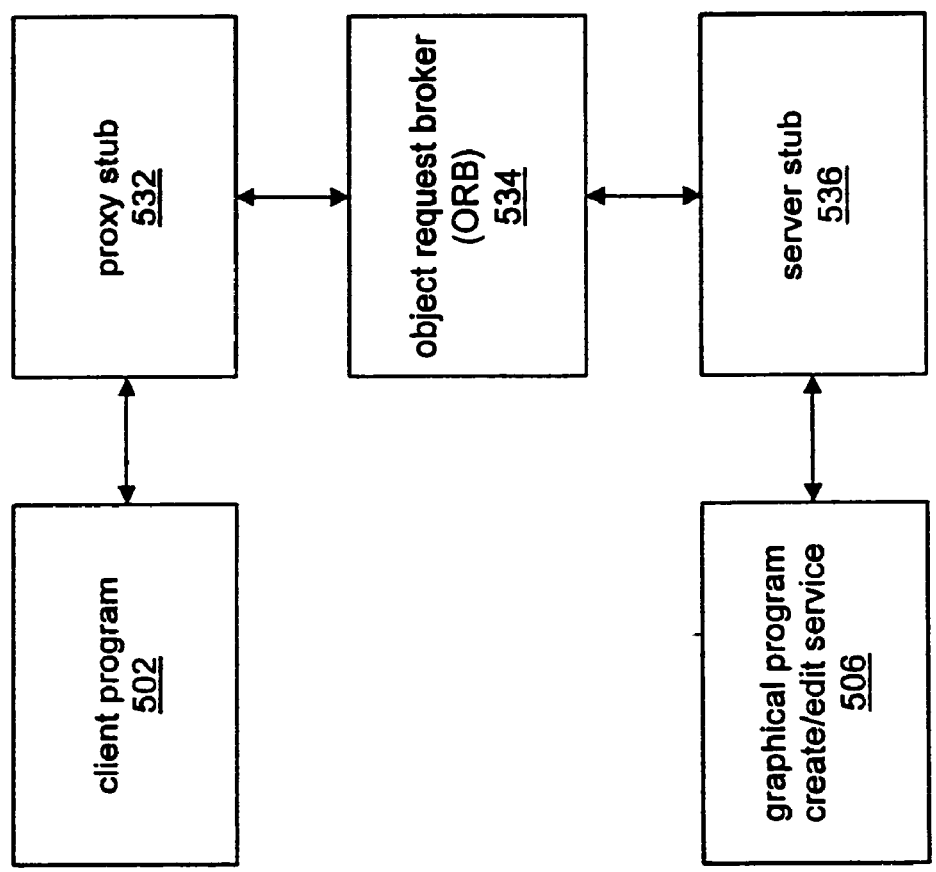
FIG. 9 illustrates an embodiment of the client/server relationship of FIG. 7 in which the client program communicates with the server program via an object request broker (ORB), and the server program is a service operable to create/edit a graphical program.

FIG. 9—ORB Client Program Accesses Graphical Program Service

FIG. 9 illustrates an embodiment of the client/server relationship of FIG. 7, in which a client program 502 may communicate with a server program 506 without needing to use a protocol specific to the client or server programs. In the embodiment shown in FIG. 9, the client program 502 is a program which communicates with the server program 506 via an object request broker (ORB), and the server program 506 is a service operable to create/edit a graphical program, referred to as a graphical program service. The client program 502 may be a text-based program, such as a Visual Basic, C++, Java, etc. program, or may be a graphical program. The graphical program service 506 may be implemented in any of various ways. For example, the service 506 may encapsulate or call a portion of a graphical programming environment which is operable to create/edit a graphical program, or alternatively, the service 506 may be a standalone program operable to create/edit a graphical program.

FIG. 9 illustrates the general relationship in which a client program references a service object via an ORB. The ORB may be any of various ORBs, such as the ActiveX/DCOM system, a CORBA system, a Java application environment, etc. The client program 502 requests a reference to the graphical program service 506 from the ORB 534. The ORB may create a proxy stub 532 for the client program 502 and a server stub 536 for the graphical program service. As shown in FIG. 9, the proxy stub 532 may communicate through the ORB infrastructure 534 with the server stub 536, and the server stub 536 may interface with the graphical program service 506. The proxy stub 532 may comprise API functions/methods to create/edit a graphical program which the client program 502 may invoke, and the ORB may transparently cause the graphical program service 506 to execute the corresponding functions/methods.

As an example, the ORB 532 may be the ActiveX/DCOM system, the client program 502 may be an automation client program, such as a Visual Basic automation client, and the graphical program service 506 may be an ActiveX component provided by a graphical programming environment. In this example, the client program 502 may create a reference to the ActiveX graphical program service component in the standard way and may invoke methods on the component to create/edit a graphical program. The ActiveX component may then execute appropriate portions of the graphical programming environment code in order to perform the requested operations. As another example, the ORB may be a Java application environment, and the client program 502 and the graphical program service 506 may be Java programs. In this example, the client program 502 may request an interface to the graphical program 506 and may use the interface to request the graphical program service 506 to create/edit a graphical program.

The block diagram of FIG. 9 illustrates a general architecture in which the client program 502 communicates with a graphical program service 506 via intermediate software proxies or components. Various elements of FIG. 9 may not be present, or various other elements may also be present, as appropriate for particular embodiments. In the preferred embodiment, the graphical program service is a software component such as an ActiveX component which is provided by the LabVIEW graphical programming environment for client programs to use to programmatically create/edit graphical programs.

FIGS. 10–23: VI Server Functions

The server program 506 of FIG. 7 is operable to receive requests to create/edit a graphical program from a client and perform the actual operations of creating/editing the graphical program. In the preferred embodiment, the server program of FIG. 7 is an application instance of the LabVIEW graphical programming environment. As noted above, the LabVIEW environment provides specialized support for developers of instrumentation and industrial automation applications, and a LabVIEW graphical program may be referred to as a virtual instrument or VI. The LabVIEW environment comprises functionality referred to as "VI Server" which enables client programs to communicate with the LabVIEW environment. The VI Server functionality enables client programs to create or edit a LabVIEW graphical program or VI.

A client program which requests LabVIEW to create/edit a VI may itself be a VI. A client VI may include particular nodes in the VI which utilize the VI Server functionality of a LabVIEW instance to request the LabVIEW instance to create a new VI, add objects to the VI, etc. These nodes are described in FIGS. 10–23 below, and FIGS. 24–27 illustrate exemplary uses of these nodes. LabVIEW also provides components such as ActiveX components which enable text-based programs such as Visual Basic programs, Visual C++ programs, etc. to access the VI Server functionality. In the preferred embodiment, these components enable text-based programs to perform all of the functions described below.

It is noted that, although the implementations of the blocks shown in FIG. 7 are described with reference to the preferred embodiment of LabVIEW and VI Server, these implementations may differ in other embodiments.

Figure 10:
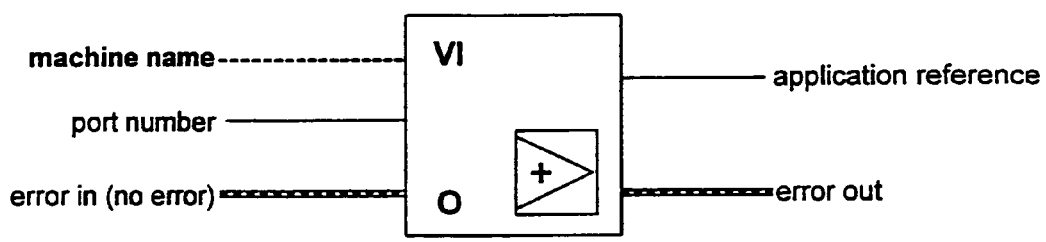
FIGS. 10–20 illustrate graphical program nodes that may be included in a first graphical program in order to programmatically create or edit a second graphical program.

FIG. 10—Open Application Reference Node

FIG. 10 illustrates the Open Application Reference node. The Open Application Reference node returns a reference to a VI Server application running on the specified computer. If an empty string is specified for machine name, then the node returns a reference to the local LabVIEW application in which this function is running. If a machine name is specified, then the node attempts to establish a TCP connection with a remote VI Server on that machine on the specified port.

The application reference output can be used as an input to the Property and Invoke nodes described below to get or set properties and invoke methods on the application. The application reference output is used as the input to the Open VI Reference function to obtain references to VIs in that application. The reference is closed with the Close Application or VI Reference function. If the user forgets to close this reference, the reference closes automatically when the top level VI associated with this function finishes executing. However, closing the reference operates to conserve the resources involved in maintaining the connection.

The following describes the inputs and outputs of the Open Application Reference node:

machine name is the address of the computer that runs a copy of LabVIEW to which it is desired to establish a connection. This address can be in dotted decimal notation (such as 130.164.15.250) or domain name notation (such as foo.natinst.com). An empty string will cause this function to return a reference to the local LabVIEW. The machine name input enables client programs to communicate with a VI Server instance running on any computer connected to the Internet.

port number is the port on which the remote LabVIEW application is listening. If port number is not wired, the default VI Server listener port number (e.g., 3363) is used.

error in describes error conditions that occur prior to the execution of this function. The default input of this cluster is "no error". If the error Boolean of this cluster is True, the Open Application Reference function will do nothing but pass through the error via the error out output.

application reference is the reference to the specified application.

error out contains error information. If error in indicates an error, error out contains the same error information. Otherwise it describes the error status that this function produces.

Figure 11:
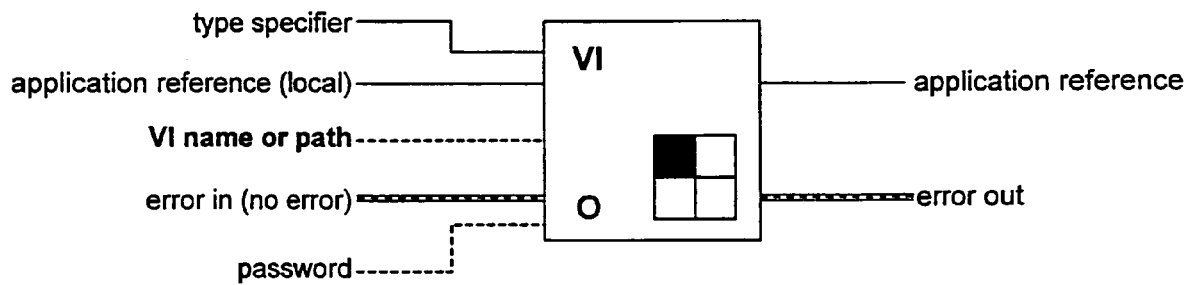

FIG. 11—Open VI Reference Node

FIG. 11 illustrates the Open VI Reference node. The Open VI Reference node returns a reference to a VI specified by a name string or path to the VI's location on disk. This reference may then be used to edit the VI. In the current embodiment, references can only be obtained to standard VIs. This excludes Control, Typedef, and Global VIs. In the preferred embodiment, the Open VI Reference node can be used to obtain a reference to any VI.

References to VIs in another LabVIEW application are obtained by wiring an application reference (obtained from the Open Application Reference function) to this function. In this case, the path input refers to the file system on the remote LabVIEW computer. If a reference to the local LabVIEW application is wired the same behavior is obtained as if nothing had been wired to the application reference input.

If editing operations are to be performed on the referenced VI, and the VI has a password-protected diagram, the password is provided to the password string input. If the incorrect password is provided, the Open VI Reference function returns an error and an invalid VI reference. If no password is provided when opening a reference to a VI that is password protected, the reference can still be obtained, operations can only be performed that do not edit the VI.

If the specified VI is to be called through the Call By Reference function, a strictly-typed VI reference is wired to the type specifier input. The function ignores the value of this input. Only the input's type—the connector pane information—is used. By specifying this type, the Open VI Reference function verifies at run time that the referenced VI's connector pane matches that of the type specifier input.

If a Generic VI refnum type is wired to the type specifier input, this results in the same behavior as if the type specifier input had not been wired at all.

If the type specifier input is wired with a strictly-typed VI refnum, the VI must meet several requirements before the VI reference is returned successfully:

1) The VI cannot be broken for any reason.

2) The VI must be runnable as a subVI, that is, it cannot be active as a top-level VI (unless the VI is re-entrant).

3) The connector pane of the VI must match that of the type specifier.

If the user forgets to close this reference using a close reference node, the reference closes automatically when the top-level VI associated with this function finishes executing. However, closing the reference operates to conserve the resources involved in maintaining the connection.

If a strictly-typed reference to a reentrant VI is obtained, a dedicated data space is allocated for that reference. This data space is preferably always used and is used only in conjunction with the output VI reference. This can lead to some new behaviors in LabVIEW. For example, parallel calls (using the Call By Reference node) to a reentrant VI using the same VI reference do not execute in parallel, but executes serially, one after the other. As another example, a reentrant VI could get a reference to itself (allocating a new data space) and call itself recursively through the Call By Reference node. It is noted that allocating a data space dynamically is both time consuming and memory consuming and is not generally recommended for implementing recursive algorithms.

A VI reference is similar to what is known as a function pointer in other languages. However, in LabVIEW, these function pointers also can be used to reference VIs across a network.

The following describes the inputs and outputs of the Open VI Reference node:

application reference is a reference to a LabVIEW application. If this input is left unwired, the reference is to an application on the local version of LabVIEW. If the input is wired, and the reference is to a remote version of LabVIEW, then the remote LabVIEW is queried to return the VI reference.

type specifier is used for its data type only. The value of the input is ignored. The data type of the type specifier input determines the data type of the vi reference output.

VI name or path is polymorphic and can accept a string containing the name of the desired VI, or a path containing the complete path (including the name) to the desired VI. If a name string is wired, then the VI must already be in memory. If a path is wired and the VI is already in memory, the VI in memory is obtained, whether its path is the same as the input or not. If the VI is not in memory, then the VI must be at the specified path for this function to succeed. If the VI is at that location, the VI is loaded into memory.

error in describes error conditions that occur prior to the execution of this function. The default input of this cluster is no error.

password is the plain-text password string for the VI. If the VI is not password protected, the input is ignored. If the VI is password protected and an incorrect password is entered, the VI can be referenced, but the VI cannot be edited through that VI reference.

vi reference is the refnum associated with the requested VI. If the function fails, "not-a-refnum" is returned.

error out contains error information. If error in indicates an error, error out contains the same error information. Otherwise error out describes the error status that this VI produces.

If the user specifies a remote version of LabVIEW by the application reference input, the path is interpreted on the remote machine in the context of the remote file system. The path is expressed using the local computer's path separators, but is translated to the remote computer's path separators when the request arrives there. For example, to reference a VI on a Macintosh at My HD:LabVIEW VIs.foo.vi from a Windows application, the Window's path syntax: My HD:\LabVIEW VIsfoo.vi would be used. Conversely, to reference a VI on a Windows computer at C:\labview\foo.vi from a Macintosh application, the Macintosh path syntax: C:labview.foo.vi would be used.

Figure 12:
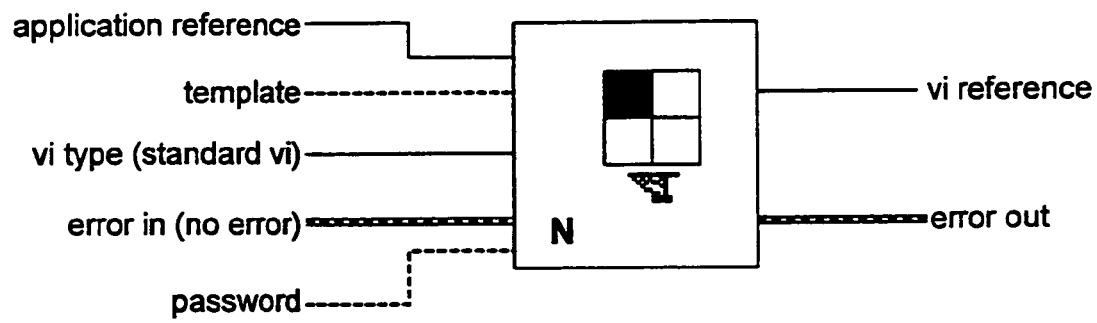

FIG. 12—New VI Reference Node

FIG. 12 illustrates the New VI Reference node. The New VI Reference node creates a new VI and outputs a reference to the new VI. The following describes the inputs and outputs of the New VI Reference node:

application reference is an input reference to a local or remote LabVIEW application. Such a reference may be obtained from the Open Application Reference node. If this input is left unwired, the reference is to an application on the local version of LabVIEW.

template is a path of or reference to an existing VI to be used as a template for the new VI. If the template input is wired, the new VI will be a copy of the template VI.

vi type specifies the type of VI to create. The possible types are: standard VI, global VI, or control VI.

error in describes error conditions that occur prior to the execution of this function. The default input of this cluster is no error.

password is the password input for the template VI, if a password-protected VI is wired to the template input. If the template VI is not password protected, the password input is ignored.

vi reference is the refnum associated with the newly created VI. If the function fails, "not-a-refnum" is returned.

error out contains error information. If error in indicates an error, error out contains the same error information. Otherwise error out describes the error status that this node produces.

Figure 13:
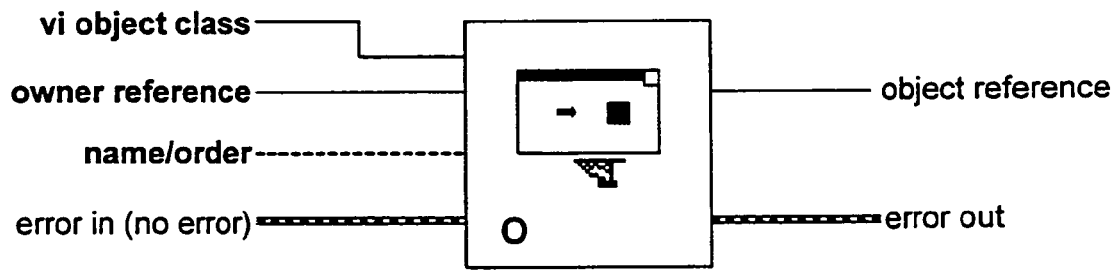

FIG. 13—Open VI Object Reference Node

Figure 22:
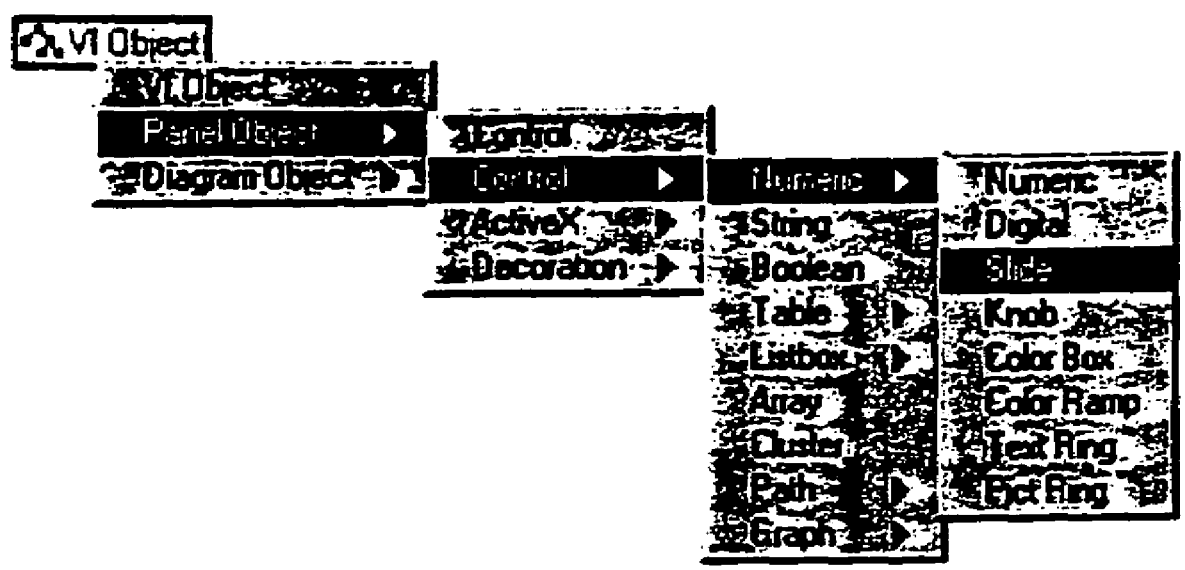
FIGS. 22 and 23 illustrate how a user may select graphical program objects to create or edit by choosing from hierarchical menus.

FIG. 13 illustrates the Open VI Object Reference node. The Open VI Object Reference node outputs a reference to an object contained in a VI. The following describes the inputs and outputs of the Open VI Object Reference node:

vi object class specifies the type of object reference to obtain. References to both objects of a front panel (user interface panel) and of a block diagram may be obtained. FIG. 22 illustrates how a user may choose a value for the vi object class input by selecting from a hierarchical menu. For example, a "slide" value may be chosen to designate that the reference to obtain is a reference to a slide user interface control.

owner reference is an input reference to the object that "owns" or "contains" the object for which a reference is to be obtained. The owner reference may be a reference to a VI or to an object within a VI. For example, the owner reference may be a reference to a block diagram node, and the reference to be obtained may be a reference to an input terminal of the block diagram node.

name/order identifies the name or order, e.g. zplane order, of the object for which to obtain a reference. The name/order input may be a simple string, an array of strings, or a numeric constant. An array of names may be used if the object is a nested object. For example, to access the status boolean of an error cluster in an array called "myArray", the name array may be: ["myArray", NULL, "status"].

error in describes error conditions that occur prior to the execution of this function. The default input of this cluster is no error.

object reference is an output reference to the object specified by the node inputs. If the function fails, "not-a-refnum" is returned.

error out contains error information. If error in indicates an error, error out contains the same error information. Otherwise error out describes the error status that this node produces.

Figure 14:
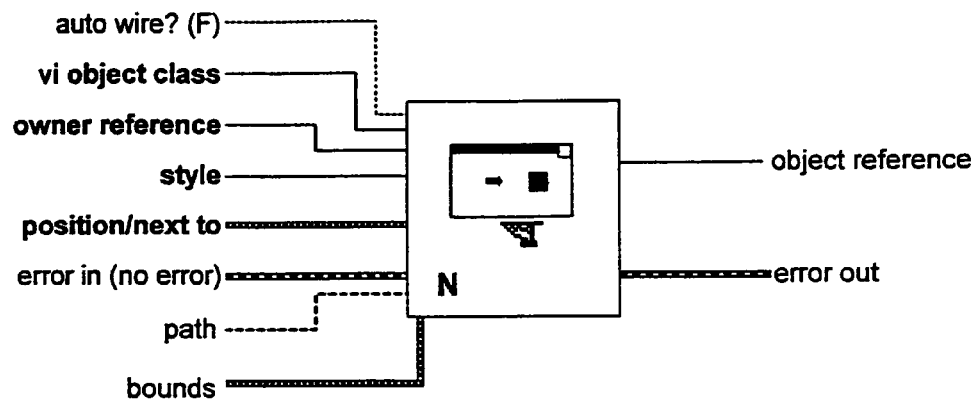

FIG. 14—New VI Object Reference Node

Figure 23:
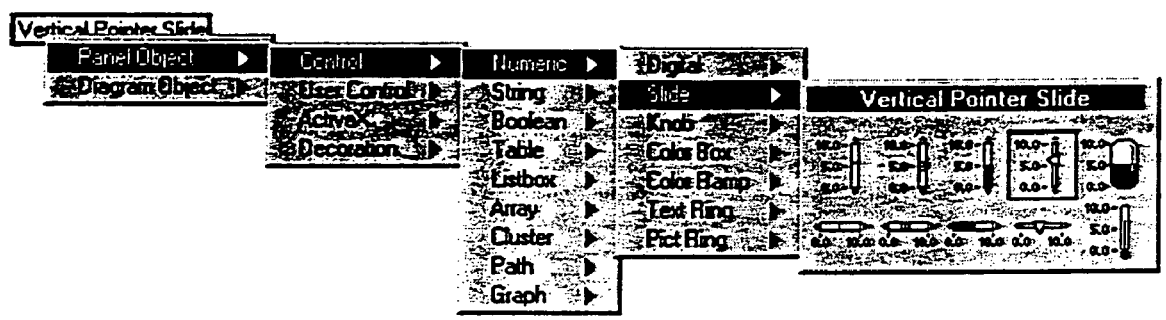

FIG. 14 illustrates the New VI Object Reference node. The New VI Object Reference node creates a new VI object and outputs a reference to the new VI object. The following describes the inputs and outputs of the New VI Object Reference node:

auto wire is a boolean input specifying whether to automatically wire the terminals of the new object with compatible terminals of a source object. This input is only applicable for diagram objects, not user interface objects. If this input is wired, then the position/next to input should also be wired.

vi object class specifies the type of object to create. Both objects for a front panel (user interface panel) and for a block diagram may be created. FIG. 22 illustrates how a user may choose a value for the vi object class input by selecting from a hierarchical menu. For example, a "slide" value may be chosen to designate that the reference to obtain is a reference to a slide user interface control.

owner reference is a reference to the VI or VI object that will "own" or "contain" the new object. For example, the owner may be the VI, and the new object may be a new function node to add.

style specifies the style or sub-class of object to create. FIG. 23 illustrates how a user may choose a value for the style input by selecting from a hierarchical menu. For example, if "slide" is chosen as the vi object class input, then "vertical pointer slide" may be chosen for the style input. The style input is ignored if the path input is wired.

position/next to specifies a position for the new object. An X-Y coordinate pair may be wired to this input, or a reference to an existing object may be wired. If an object reference is wired in, then the new object is positioned next to the referenced object.

error in describes error conditions that occur prior to the execution of this function. The default input of this cluster is no error.

path specifies the location of a user control/VI.

bounds specifies the size of the new object. The bounds input is ignored for fixed-size objects.

Figure 15:
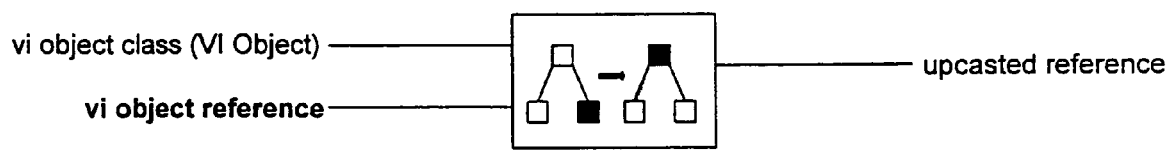

FIG. 15—Upcast Reference Node

FIG. 15 illustrates the Upcast Reference node. The Upcast Reference node casts the type of a reference to an object to the type of a superclass for the object. The following describes the inputs and outputs of the Upcast Reference node:

vi object reference specifies a VI object reference to upcast.

vi object class specifies a class to cast the object reference to. FIG. 22 illustrates how a user may choose an object class from a hierarchical menu. For example a reference to a vertical pointer slide object may be upcasted to a reference to a general slide object.

upcasted reference is an output reference with the specified class as the reference type information. If the upcast fails, "not-a-refnum" is the output value.

Figure 16:
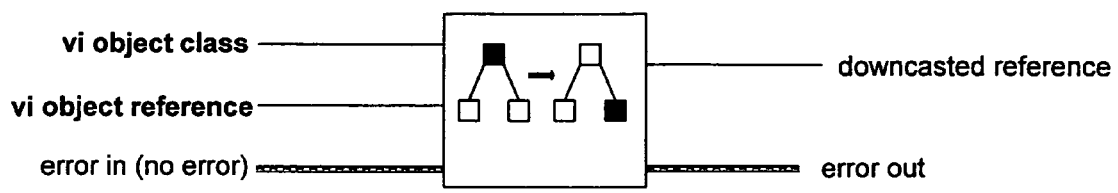

FIG. 16—Downcast Reference Node

FIG. 16 illustrates the Downcast Reference node. The Downcast Reference node casts the type of a reference to an object to the type of a subclass. The following describes the inputs and outputs of the Downcast Reference node:

vi object reference specifies a VI object reference to downcast.

vi object class specifies a class to cast the object reference to. FIG. 23 illustrates how a user may choose a class from a hierarchical menu. For example a reference to a general slide object may be downcasted to a reference to a vertical pointer slide object.

error in describes error conditions that occur prior to the execution of this function. The default input of this cluster is no error.

downcasted reference is an output reference with the specified class as the reference type information. If the downcast fails, "not-a-refnum" is the output value.

error out contains error information. If error in indicates an error, error out contains the same error information. Otherwise error out describes the error status that this node produces.

Figure 17:
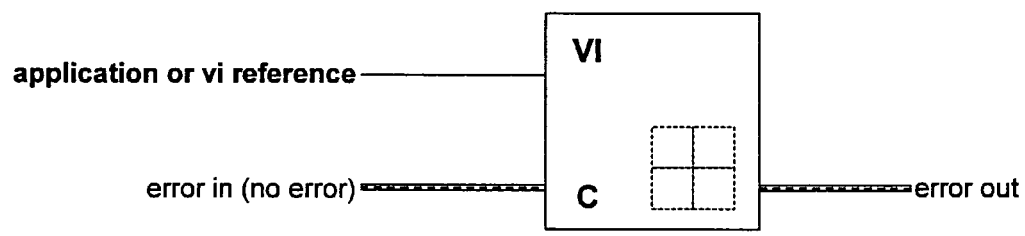

FIG. 17—Close Application or VI Reference Node

FIG. 17 illustrates the Close Application or VI Reference node. The Close Application or VI Reference node closes an open VI or the connection to a LabVIEW application instance. The following describes the inputs and outputs of the Close Application or VI Reference node:

application or vi reference is the refnum associated with an open VI or a LabVIEW application instance.

error in describes error conditions that occur prior to the execution of this function. The default input of this cluster is no error.

error out contains error information. If error in indicates an error, error out contains the same error information. Otherwise it describes the error status that this node produces.

Figure 18:
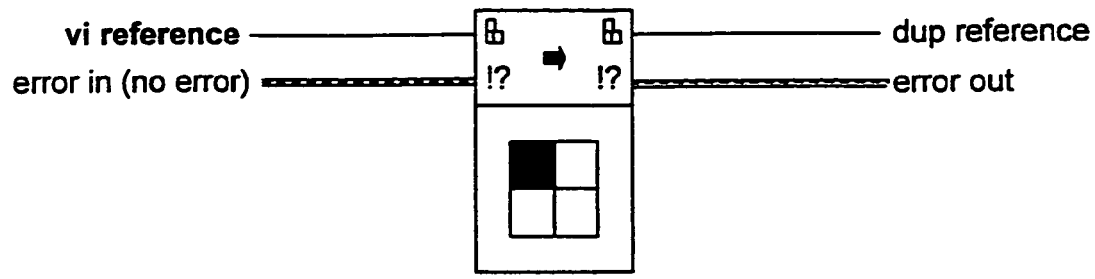

FIG. 18—Call By Reference Node

FIG. 18 illustrates the Call By Reference node. The Call By Reference node may be used to call a VI, such as a VI which has been created programmatically. The Call By Reference node is similar to a sub-VI node in that either can be used to call a VI. However, a sub-VI node is statically linked to a particular VI that the user determines when he/she drops the node on the diagram. With the Call By Reference node, the VI that is called is determined dynamically at run time by the value of the VI reference wired to the reference input at the top of the node. Thus, the VI which is called by the Call By Reference node may be on a different computer.

The top of the Call By Reference node includes four terminals: an input/output pair of flow through VI reference terminals, and an input/output pair of flow through error clusters. The VI reference input accepts wires only from strictly-typed VI references. Below these terminals is an area within which a connector pane resides (is displayed) that is identical to that of a VI with its terminals showing (rather than its icon). The connector pane of the strictly-typed VI reference input determines the pattern and data types of this connector pane which is displayed in the Call By Reference node icon. The user wires to these terminals just as he/she would to a normal sub-VI.

As long as none of the terminals of the connector pane have wires attached to them, the connector pane will adapt automatically to that of the input VI reference's connector pane. However, if any of them are wired, the node does not adapt automatically, and the user must explicitly change the connector pane (possibly breaking those wires) by popping up on the node and selecting the Adapt To Reference Input menu item.

At run time there is a small amount of overhead in calling the VI that is not necessary in a normal sub-VI call. This overhead comes from validating the VI reference and a few other bookkeeping details. However, for a call to a VI in the local LabVIEW, this overhead should be insignificant for all but the smallest subVIs. Calling a VI located in another LabVIEW application (across the network) may involve more overhead.

The following describes the inputs and outputs of the Call By Reference node:

vi reference is the refnum associated with a VI that is already open.

error in describes error conditions that occur prior to the execution of this function. The default input of this cluster is no error.

dup reference has the same value as reference.

error out contains error information. If error in indicates an error, error out contains the same error information. Otherwise, it describes the error status that this VI produces.

Figure 19:
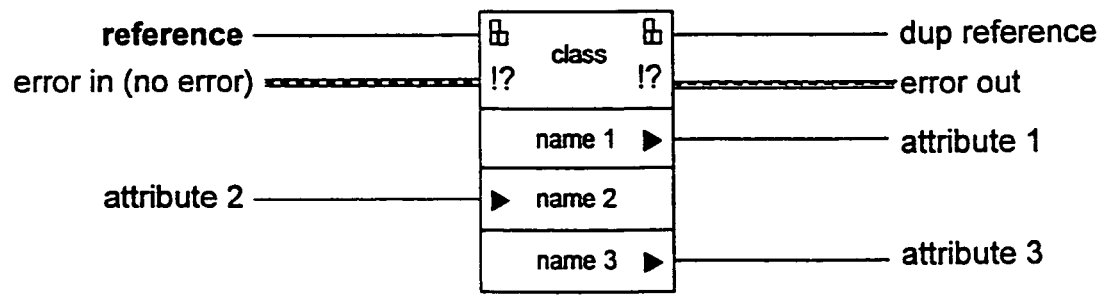

FIG. 19—Property Node

FIG. 19 illustrates the Property node. The Property node sets (writes) or gets (reads) application, VI and VI object property information. Thus, the Property node may be used to create/edit a graphical program. For example, the property node may be used to change the color of a user interface object, etc.

To select a specific property, the user pop ups on one of the name terminals and selects Properties. The list of available properties to select from may depend on the type of object wired to the reference input. To set property information, the user pop ups and selects Change to Write. To get property information the user pop ups and selects Change to Read. Some properties are read only, so Change to Write cannot be seen in the popup menu. If the user desires to add items to the node, the user pop ups and selects Add Element or clicks and drags the node to expand the number of items in the node. The properties are changed in the order from top to bottom. If an error occurs on one of the properties, the node stops at that property and returns an error. In this case, no further properties are handled. The error string reports which property caused the error. If the small direction arrow on a property is on the left, then the property value is being set. If the small direction arrow on the property is on the right, the user is getting the property value. Each property name has a short or long name which can be changed by popping up and selecting Name Format. Another name format is no name where only the type is displayed for each property.

The Property node may be used to access or affect a number of different properties, including VI (virtual instrument) and application properties.

The inputs and outputs of the Property node are described below.

reference is the refnum associated with a VI object, VI, or a LabVIEW application instance.

error in describes error conditions that occur prior to the execution of this function. The default input of this cluster is no error.

dup reference has the same value as reference.

error out contains error information. If error in indicates an error, error out contains the same error information. Otherwise error out describes the error status that this node produces.

Figure 20:
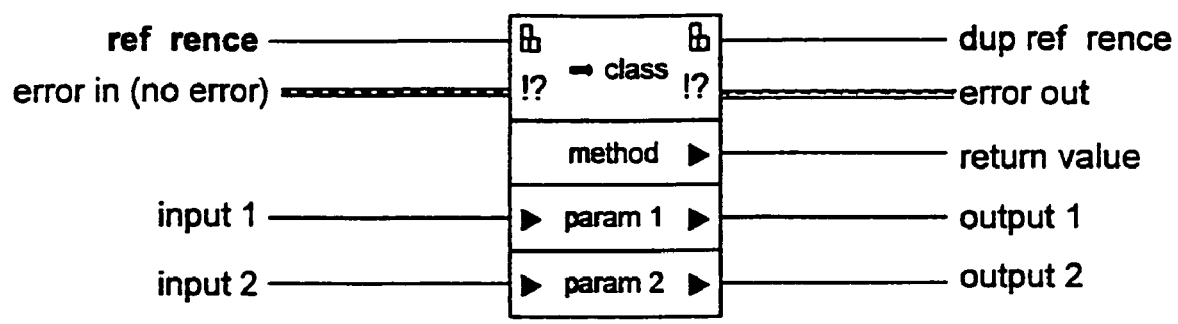

FIG. 20—Invoke Node

FIG. 20 illustrates the Invoke node. The Invoke node invokes a method or action on a VI or VI object. Thus, the Invoke node may be used to create/edit a graphical program. For example, a method may be invoked on a block diagram node to reposition the node, wire the node to another node, etc. Most methods have parameters associated with them. To select the method, the user pops up anywhere on the node and select Methods. Once the user selects the method, the associated parameters appear in the node, as shown in FIG. 20. The number of parameters shown may vary, depending on which method is selected. Each parameter may have an input terminal, output terminal, or both. An output terminal may be present for the return value of the method. The Invoke node may be used to invoke a number of different methods, including VI (virtual instrument), VI object, and application methods.

The inputs and outputs of the Invoke node are as follows:

reference is the refnum associated with a VI object, VI, or application on which the user desires to perform an action.

error in describes error conditions that occur prior to the execution of this function. The default input of this cluster is no error.

dup reference has the same value as reference.

error out contains error information. If error in indicates an error, error out contains the same error information. Otherwise error out describes the error status that this node produces.

Figure 21:
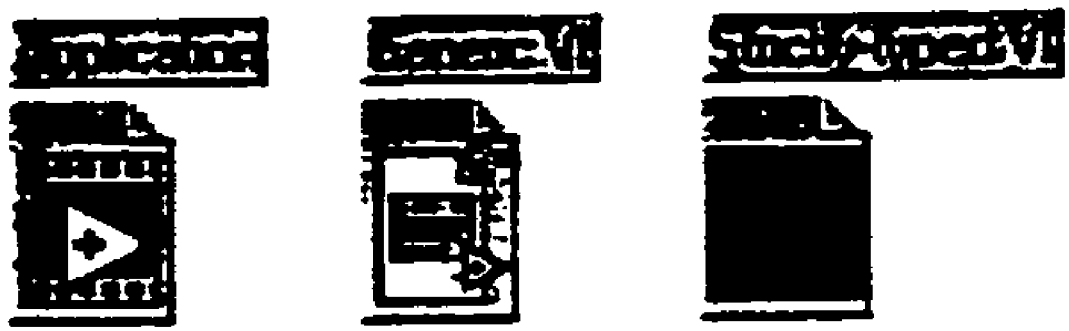
FIG. 21 illustrates user interface controls which may be placed on a front panel in order to interactively obtain a reference to a server program or a graphical program to edit.

FIG. 21—VI Server Refnum Controls

FIG. 21 illustrates user interface controls which may be placed on a front panel in order to interactively obtain a reference, such as a reference to a VI or an object of a VI. FIG. 21 illustrates exemplary front panel refnum controls for Application, Generic VI, and Strictly-typed VI data types. It is noted however, that a graphical programming system may provide such front panel refnum controls for any of the various objects associated with a VI, including terminals, etc. As shown in FIG. 21, the image in each refnum icon indicates the type of the refnum.

As shown in FIG. 21, VI references may be sub-divided into two classes of VIs: the Generic VI and the Strictly typed VI. In general, a Generic VI reference is used to perform editing operations (e.g., setting properties or invoking functions) on any VI, and a Strictly-typed VI reference is used to call a dynamically loaded VI as a sub-VI, and to perform operations that do not edit or change the VI. The Application class refnum icon displays the LabVIEW application icon. The Generic VI class refnum icon displays the VI file icon. The Strictly-typed VI class refnum icon depicts the connector pane that defines the class.

A front panel refnum provides a reference to an appropriate entity. Thus, the Application refnum provides a reference to a graphical programming application, e.g. a LabVIEW application, the generic VI refnum provides a reference to a generic virtual instrument or generic graphical program, and the strictly typed VI refnum provides a reference to a specified graphical program or VI. Other types of refnums provide references to their corresponding graphical program objects.

In the preferred embodiment, the user selects a VI Server front panel refnum control and places this refnum control in a front panel of a VI. The user then configures the refnum to be an appropriate type, such as an Application refnum, a Generic VI refnum, a Strictly-typed VI refnum, or another type of refnum. Once the user has configured the refnum control to the appropriate type, the refnum control takes on the respective appearance by the class selected by the user. For example, if the user drops the front panel refnum control on the front panel and configures the refnum to be of the Application class, the refnum takes on the Application icon appearance shown in FIG. 21.

When the user drops or places the VI Server refnum in the front panel and configures the refnum, corresponding terminals appear in the block diagram. These terminals provide the information on the application or graphical program referenced by the refnum.

Figure 24:
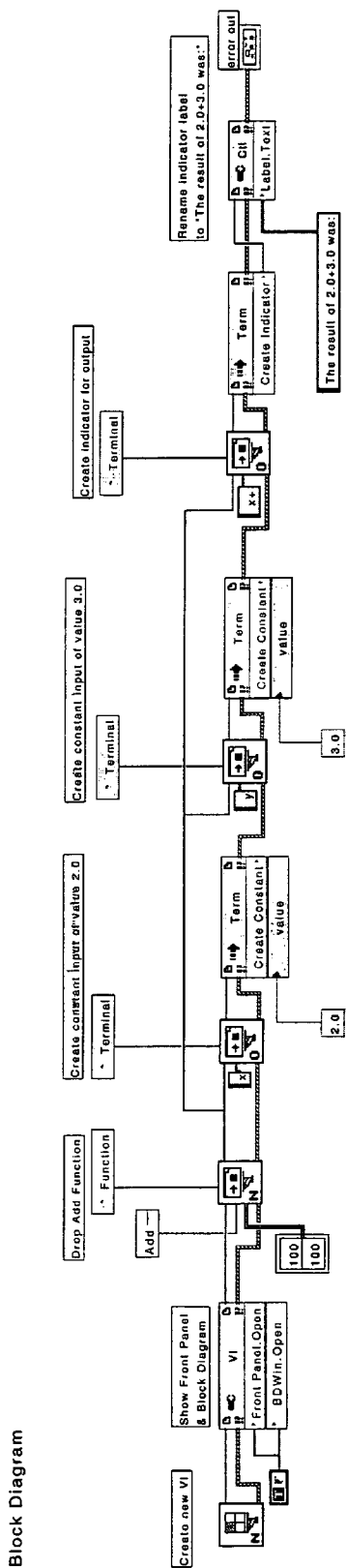
FIG. 24 illustrates a simple client graphical program that creates the graphical program of FIGS. 5 and 6.

FIG. 24—Programmatic Graphical Program Creation Example

FIG. 24 illustrates an exemplary client graphical program that uses the nodes described above to dynamically create the graphical program of FIGS. 5 and 6. Various sections of the FIG. 24 program are labeled in the diagram with the purpose of the code.

As shown in FIG. 24, a New VI Reference node is used to create a new graphical program. Since no application reference is passed to the New VI Reference node, the new graphical program is created by the default local LabVIEW application instance. The New VI Reference node outputs a reference to the new graphical program, and the Property node "reference" input receives this reference. The Property node sets properties of the graphical program, specifying that the user interface panel window and block diagram window of the graphical program are open. As described above, a user may pop up a menu to select the desired property of an object to get or set. The list of displayed properties may vary according to what type of object the reference input references.

After the graphical program has been created and modified as described above, a New VI Object Reference node is used to create the Addition function node shown in FIG. 6.

Next, the Open VI Object Reference Node is used to obtain a reference to the "x" input terminal of the Addition function node. The reference to the "x" input terminal is passed to an Invoke node, which creates a constant value of 2.0 that is wired to the "x" input terminal. As described above, a user may pop up a menu to select the desired method to invoke on an object. The list of displayed methods may vary according to what type of object the reference input references. Similarly, an Open VI Object Reference Node and an Invoke node are used to create a constant value of 3.0 that is wired to the "y" input terminal of the Addition function node.

Next, an Open VI Object Reference Node and an Invoke node are used to create a user interface indicator control that is wired to the output terminal of the Addition function node.

Finally, a Property node is used to rename the label of the user interface indicator control to, "The result of 2.0+3.0 was:", as shown in FIG. 5. Note that the reference to the user interface indicator control created by the preceding Invoke node is wired as the input reference to this Property node.

Figure 25:
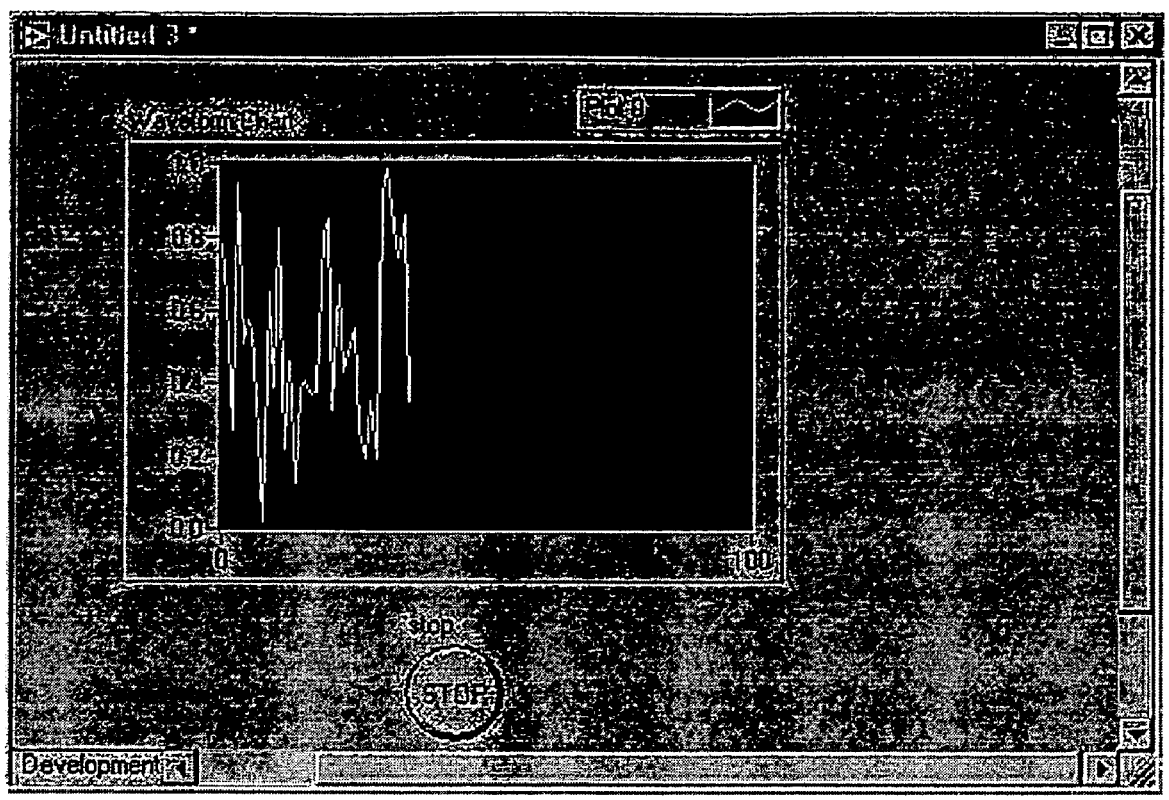
FIGS. 25 and 26 illustrate a slightly more complex example of a graphical program than the program of FIGS. 5 and 6.
Figure 26:
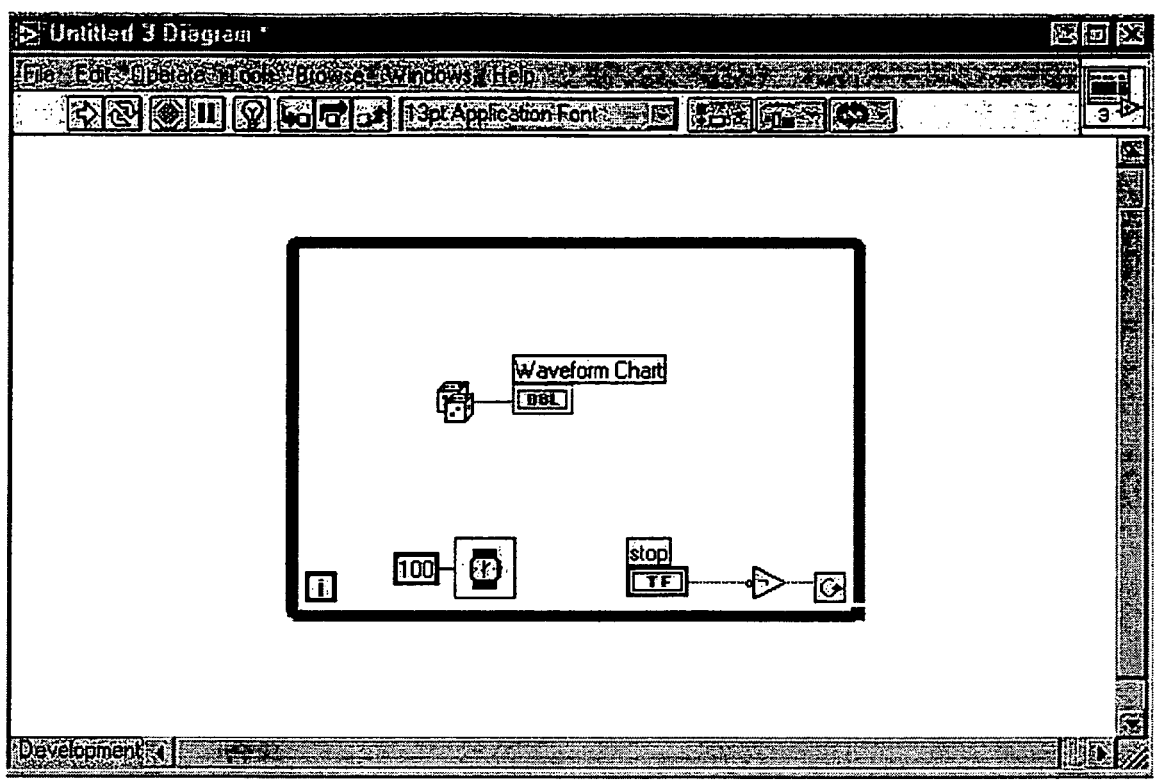
Figure 27A:
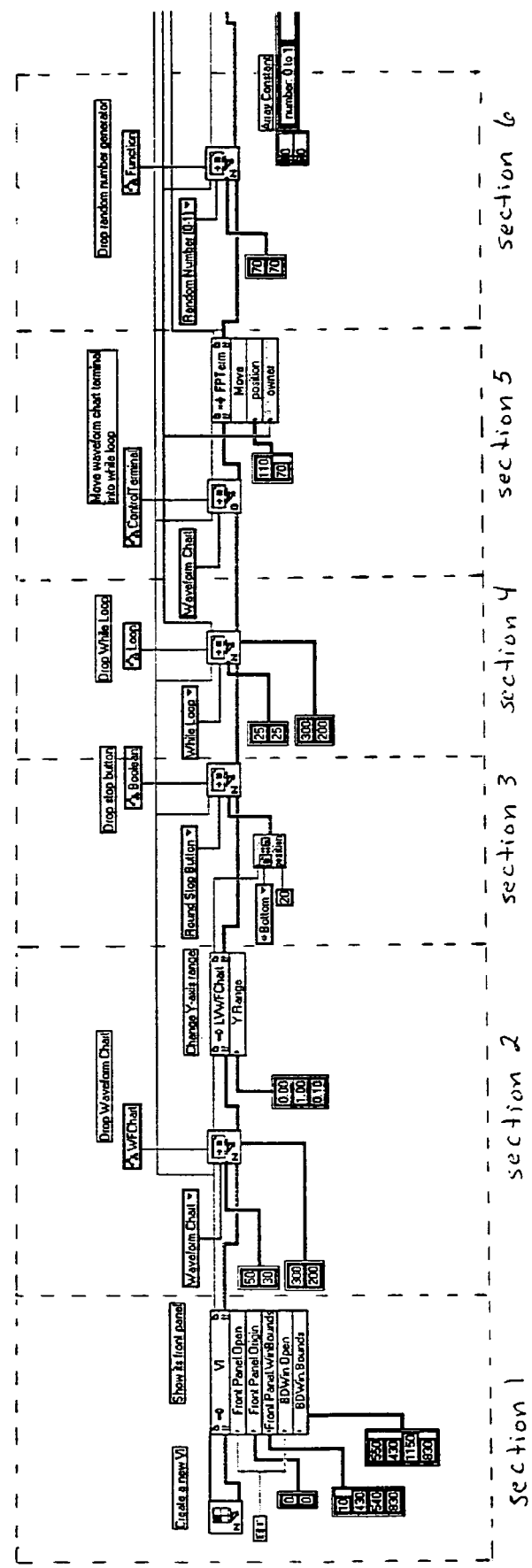
FIG. 27 illustrates a graphical program client that creates the graphical program of FIGS. 25 and 26.
Figure 27:
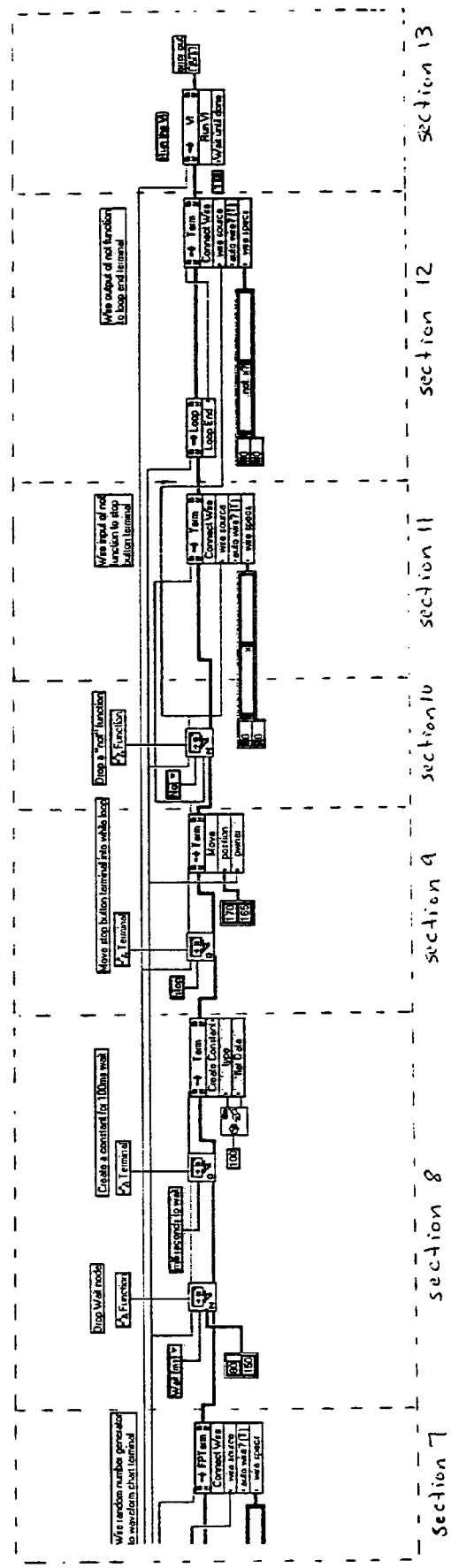

FIGS. 25–27: Programmatic Graphical Program Creation Example

FIGS. 25 and 26 illustrate a slightly more complex example of a graphical program than the program of FIGS. 5 and 6. FIG. 27 illustrates a client graphical program that uses the nodes described above to create the program shown in FIGS. 25 and 26. The client graphical program of FIG. 27 may be created interactively by a user, as described above.

FIG. 25 illustrates a user interface panel which includes a waveform chart control and a button control. FIG. 26 illustrates a block diagram representing the execution and data flow of the program. Each of the user interface controls of FIG. 25 has a corresponding user interface node in the FIG. 26 block diagram. The rectangular object 610 with the arrowhead is a while loop. The icon 612 is the condition terminal for the while loop 610.

When this program is run, the graphical code shown within the while loop executes until the input to the condition terminal 612 becomes "false". As shown, the user interface node 614 for the stop button is connected to a boolean "Not" function. By default, the output of the stop button user interface node 614 is "false". When a user presses the stop button, the output of the node 614 becomes "true", and the input to the condition terminal 612 thus becomes "false". When this happens, the program terminates, since in this example there is no additional code to execute after the while loop ends.

The icon 616 represents a random number generator function node. The output terminal of the random number node 616 is connected to the input terminal of the waveform chart user interface node 618. Thus, for each iteration of the while loop, a random number is generated and plotted on the waveform chart user interface control. FIG. 25 shows how the waveform chart may appear after several loop iterations. The icon 620 is simply a "wait" function icon with an input constant of 100, which causes a pause of 100 milliseconds for each loop iteration.

FIG. 27 illustrates a client graphical program which uses the nodes described above to dynamically create the graphical program of FIGS. 25 and 26. For clarity, the client graphical program is broken into sections, and the function of each section is described.

In section 1 of FIG. 27, a New VI Reference node is used to create a new graphical program. Since no application reference is passed to the New VI Reference node, the new graphical program is created by the default local LabVIEW application instance. The New VI Reference node outputs a reference to the new graphical program, and the Property node "reference" input receives this reference. As shown, the Property node sets various properties of the graphical program. For example, the origin and coordinate bounds of the user interface panel (front panel) are set, the coordinate bounds of the block diagram window are set, etc. As described above, a user may pop up a menu to select the desired property of an object to get or set. The list of displayed properties may vary according to what type of object the reference input references.

In section 2 of FIG. 27, a New VI Object Reference node is used to create the waveform chart user interface control. As shown, the reference to the new graphical program generated by the New VI Reference node in section 1 is connected as the "owner reference" input of the New VI Object Reference node. Other inputs are also connected which specify the type of object to create, the position to place the object, etc. Once the waveform control is created, the New VI Object Reference node outputs a reference to the waveform control. The property node of section 2 receives this reference input and changes the Y axis range of the waveform control to range from 0.0 to 1.0.

In section 3 of FIG. 27, a New VI Object Reference node is used to create the stop button user interface control. A positioning function is used to specify the position input for the node, in order to appropriately position the button under the waveform chart on the user interface panel.

In section 4 of FIG. 27, a New VI Object Reference node is used to create and position the while loop.

In section 5 of FIG. 27, an Open VI Object Reference node is used to obtain a reference to the user interface node on the block diagram corresponding to the waveform chart user interface control. As shown, a "Control Terminal" data type is specified as the class of the object for which to obtain a reference, "Waveform Chart" is specified as the name of the object for which to obtain a reference, and the reference to the new graphical program is specified as the owner reference. Together, these inputs identify the waveform chart user interface node. Once the reference to the waveform chart user interface node is obtained, the reference is connected to the reference input of the Invoke node shown in section 5. The Invoke node invokes a "Move" method on the waveform chart user interface node, moving it into the area bounded by the while loop. As described above, a user may pop up a menu to select the desired method to invoke on an object. The list of displayed methods may vary according to what type of object the reference input references.

In section 6 of FIG. 27, a New VI Object Reference node is used to create the random number generator function. As shown, the reference to the while loop created in section 4 is used as the "owner reference" input of the New VI Object Reference node. Thus, the random number function is created within the while loop.

In section 7 of FIG. 27, an Invoke node is used to connect the random number generator function to the waveform chart user interface node. As shown, the reference to the waveform chart user interface node is connected to the reference input of the Invoke node. Once the user selects the "Connect Wire" method as the method to invoke, the Invoke node displays a list of relevant input parameters. As shown, the reference to the random number generator function node is supplied as the "wire source" input parameter. Thus, when the Invoke node invokes the "Connect Wire" method, the random number generator function node is connected to the waveform chart user interface node.

In section 8 of FIG. 27, a New VI Object Reference node is used to create a wait function node, an Open VI Object Reference node is used to obtain a reference to the "milliseconds to wait" input terminal of the wait function node, and an Invoke node is used to create a numeric constant of 100 which is connected to the "milliseconds to wait" input terminal of the wait function node.

In section 9 of FIG. 27, the stop button user interface node is moved inside the area bounded by the while loop. Section 9 is similar to section 5 described above.

In section 10 of FIG. 27, a New VI Object Reference node is used to create a "Not" boolean function inside the while loop. Section 10 is similar to the sections described above.

In section 11 of FIG. 27, an Invoke node is used to connect the stop button user interface node to the Not function node. Section 11 is similar to section 7 described above.

In section 12 of FIG. 27, a Property node is used to obtain a reference to the loop condition terminal of the while loop. The reference to the condition terminal is connected as the reference input to the Invoke node shown in section 12, and the Invoke node connects the output of the Not function node to the condition terminal of the while loop, similarly to the sections described above.

In section 13 of FIG. 27, an Invoke node is used to run the newly created graphical program. As shown, the reference to the new graphical program is connected to the reference input of the Invoke node, and a "Run" method is selected as the method to invoke on the program. Although omitted from the above description, error information is propagated through the FIG. 27 client program, and the "error out" node shown in section 13 receives the final error status of the program.

Although this example is primarily concerned with creating a new graphical program, it is noted that the above-described functionality also enables programmatic editing of a graphical program. References to graphical program objects may be obtained, and various properties may be set and various methods may be invoked to move objects, resize objects, add/remove objects, reconnect objects, etc., similarly to the description above. In the preferred embodiment, any operation which a program developer may perform interactively may also be performed programmatically.

Text-Based Client Program Pseudocode

As described above, client programs may also be text-based programs. In the preferred embodiment, a text-based program may obtain a reference to a software component which includes an interface with functions or methods to perform the operations of the nodes described above. For example, a program may obtain a reference to an ActiveX component, where the interface for the ActiveX component includes a CreateNewProgram method which is comparable to the New VI Reference node, a GetProgramObjectReference method which is comparable to the Open VI Object Reference node described above, etc.

In the preferred embodiment, various types of software components are provided which enable programs of various languages executing on various systems to programmatically create/edit graphical programs. As is well known in the art, modern component-based software architecture and object oriented design techniques make it relatively straightforward to encapsulate portions of code and provide various interfaces to the code. For example, a service to create/edit a graphical program may be exposed as an ActiveX component, a CORBA component, a Java component, etc. In the preferred embodiment, the implementation of the nodes described above and the implementation of components for use in text-based programs is based on a common code base.

Configuring the VI Server

As described above, in the preferred embodiment, the server program of FIG. 7 is a LabVIEW application instance which comprises VI Server functionality. The user can configure which parts of the VI Server are available to other applications, as well as enable or disable particular protocols and specify which server resources are exported. This section describes VI Server configuration.

1. Server Configuration

To configure the server for external applications, the user selects Edit>>Preferences on the server machine and selects Server: Configuration from the drop down menu. The dialog box appears as shown in FIG. 28.

The options shown in FIG. 28 specify through which communication protocols other applications can access the VI Server: TCP/IP or ActiveX protocols. If the user enables TCP/IP, the user must enter the Port number that client applications use to connect to the server. When the user allows other applications to connect using TCP/IP, the user should also configure which Internet hosts have access to the server. See the TCP/IP Access Configuration section for more information. For more information about the VI server ActiveX interface, refer to U.S. provisional patent application Ser. No. 60/056,528 titled "System and Method for Accessing Object Capabilities in a Graphical Program" filed Aug. 21, 1997, whose inventors are Ram Kudukoli, Robert Dye, and Murali Parthasarathy, which is hereby incorporated by reference.

With Server: Configuration selected, the user also specifies which server resources are available to applications that access the VI Server. The following server resources are available:

VI Calls allows applications to make calls to VIs on the server. When the user allows other applications access to VIs, the user should also configure which VIs they have access to. See the section Exported VIs Configuration for more information.

VI Methods and Properties allows applications to read and set the properties of VIs on the server. When the user allows other applications access to VIs, the user should also configure which VIs they have access to. See the section Exported VIs Configuration for more information.

Application Methods and Properties allows applications to read and set the properties of the server.

In the example of FIG. 28, TCP/IP server access is enabled for port 5151 and the ActiveX server access is disabled. The server allows remote clients to call VIs, but does not allow access to VI or application methods and properties.

The default server settings have ActiveX enabled and TCP/IP disabled. By default, VI Calls is enabled, but VI Methods and Properties and Application Methods and Properties are disabled.

2. Exported VIs Configuration

The user may specify which VIs remote applications can access. To configure the exported VIs, the user selects Edit>>Preferences on the server computer, then selects Server: Exported VIs from the drop down menu. The dialog box appears as shown in FIG. 29. Although not shown in FIG. 29, the user may also specify various options which allow or disallow client programs to perform particular operations regarding creating/editing graphical programs. For example, the user may set up the server to allow clients to create new programs, but disallow the editing of existing programs, or the user may set a password required to edit existing programs, etc.

The Server: Exported VIs options allows the user to specify which VIs other applications can access through the VI Server. The Exported V's list specifies which VIs are exported. To change an entry, the user selects it from the list, then types into the text box at the right of the Exported VIs list. To specify whether remote computers can or cannot access that VI, the user clicks on the Allow Access or Deny Access radio buttons. The user clicks the Add button to insert a new entry after the current selection. The user clicks the Remove button to delete the current selection. The user clicks and drags an entry to change its position within the Exported VIs list. If an entry allows access to V's, a check mark appears next to the entry. If an entry denies access to V's, a "cross out" symbol appears next to the entry. If no symbol appears next to the entry, the syntax of the entry is incorrect.

Each entry in the list describes a VI name or a VI path and may contain wildcard characters (see the paragraph below on wildcard characters). Entries that contain path separators are compared against VI paths, while entries that do not contain path separators are compared against VI names only. When a remote client tries to access a VI, the server examines the Exported VIs list to determine whether to grant access to the requested VI. If an entry in the list matches the requested VI, the server either allows or denies access to that VI, based on how that entry is set up. If a subsequent entry also matches the VI, its access permission is used in place of the previous permission. If there is not a VI in the list that matches the requested VI, access to the VI is denied.

As mentioned earlier, the user can use wildcard characters in the Exported VIs list so an entry in the list matches more than one VI. The following wildcard characters can be used:

'?' matches exactly one arbitrary character, except for the path separator.

'*' matches zero or more arbitrary characters, except for the path separator.

'**' together match zero or more arbitrary characters, including the path separator.

If the user wants to match a VI with a name that contains a wildcard character, the user must escape that character using '\' on the Macintosh and UNIX platforms, and using '' on Windows.

The following tables shows some examples of Exported VI list entries. The examples use UNIX path separators.

TABLE 1

| Server: TCP/IP Access Entries | |
| --- | --- |
| * | Matches all VIs |
| /usr/labview/* | Matches all VIs in the directory /usr/labview/. |
| /usr/labview/** | Matches all VIs in the directory /usr/labview/ and any of its sub-directories. |
| Test.vi | Matches any VI named "Test.vi". |
| *export* | Matches any VI with a name that contains the string "export". |
| OK\? | Matches any VI with the name OK?. |

In FIG. 29, all VIs in the c:\labview\server directory are exported. All VIs in the c:\labview\test directory and all its sub-directories are exported as well, with the exception of the VI c:\labview\test\private.vi. Additionally, any VI that begins with the string srvr_ and ends with the string .vi is exported. No VI that begins with the string local_ and ends with the string .vi is exported, even if it is located within the c:\labview\server directory.

The default Exported VIs settings allow access to all VIs.

3. TCP/IP Access Configuration

When the user allows remote applications to access the VI Server using the TCP/IP protocol, the user should specify which Internet hosts have access to the server. To configure the clients that have access, the user selects Edit>>Preferences on the server machine and selects Server: TCP/IP Access from the drop down menu. The options appear in the Preferences dialog box as shown in FIG. 30.

Selecting Server: TCP/IP Access allows the user to specify which clients can access the VI Server. The TCP/IP Access List describes clients that either have access to or are denied access to the LabVIEW server. To change an entry, the user selects it from the list, then types into the text box at the right of the TCP/IP Access List. The user clicks on the Allow Access radio button to allow the client to access the server. The user clicks the Deny Access radio button to deny the client access to the server. The user clicks the Add button to insert a new entry after the current selection. the user clicks the Remove button to remove the current selection from the list. The user clicks and drags an entry to change its position within the TCP/IP Access List. If an address is allowed access, a check mark appears next to the entry. If an address is denied access, a "cross out" symbol appears next to the entry. If no symbol appears next to the entry, the syntax of the entry is incorrect.

When a client tries to open a connection to the server, the server examines the entries in the TCP/IP Access List to determine whether it grants access to the client. If an entry in the list matches the client's address, the server either allows or denies access, based on how the user set up the entry. If a subsequent entry also matches the client's address, its access permission is used in place of the previous permission. (For example, in FIG. 29 above, a.test.site.com in the TCP/IP Access List is allowed access even though the list indicates that all addresses ending in .test.site.com are not allowed access. See the paragraph on wildcards later in this document.) If no entry matches the client's address, access is denied.

An Internet (IP) address, such as "130.164.123.123", may have one domain name (such as "www.natinst.com") or more associated with it. The conversion from a domain name to its corresponding IP address is called name resolution. The conversion from an IP address to its domain name is called name lookup.

Name lookups and name resolutions are done through system calls that access domain name system (DNS) servers on the Internet. A name lookup or resolution can fail when the system does not have access to a DNS server, or when the address or name is not valid. A resolution problem occurs when an entry contains a domain name that cannot be resolved into an IP address. A lookup problem occurs when an entry contains a partial domain name, such as "*.natinst.com", and the lookup for the client's IP address fails.

The Strict Checking option determines how the server treats access list entries that cannot be compared to a client's IP address because of resolution or lookup problems. When Strict Checking is enabled, a denying access list entry in the TCP/IP Access List that encounters a resolution problem is treated as if it matched the client's IP address. When Strict Checking is disabled, an access list entry that encounters a resolution problem is ignored.

To specify an Internet host address, the user enters its domain name or IP address. The * wildcard can be used when specifying Internet host addresses. For example, the user can specify all hosts within the domain domain.com with the entry *.domain.com. The user can specify all hosts in the subnet whose first two octets are 130.164 with the entry 130.164. The entry * matches all addresses.

The following table shows some examples of TCP/IP Access List entries.

TABLE 2

| Server: TCP/IP Access | |
|---|---|
| * | Matches all hosts. |
| test.site.com | Matches the host whose domain name is test.site.com. |
| *.site.com | Matches all hosts whose domain name ends with *.site.com. |
| 130.164.123.123 | Matches the host with the IP address 130.164.123.123. |
| 130.164.123.* | Matches all hosts whose IP address starts with 130.164.123. |

In FIG. 30, all hosts in the site.com domain have access to the server, with the exception of all hosts in the test.site.com domain. Additionally, the hosts a.test.site.com, b.test.site.com and 130.164.123.123 have also access to the server. The host public.site.com does not have access, even though it is in the site.com domain.

The default TCP/IP Access settings allow access only to clients on the server machine.

It is noted that, if the VI Server runs on a system that does not have access to a DNS server, domain name entries should not be used in the TCP/IP Access list—requests to resolve the domain name or an IP address will fail, slowing down the system. For performance reasons, place frequently matched entries toward the end of the TCP/IP Access List.

Local Client/Server Communication

When a client on a first computer accesses an instance of a VI Server located on the first computer, i.e., accesses a local VI, the respective access node, e.g., the New VI Reference node, the Invoke node, the Property node, etc., operates to manipulate or access the VI in a similar manner as if the VI were in the client graphical program.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for automatically creating a graphical program, comprising:
   storing a first program, wherein the first program is executable to automatically create a new graphical program based on received information;
   executing the first program, wherein said executing comprises automatically creating the new graphical program based on the received information, wherein said automatically creating the new graphical program comprises:
      automatically creating a plurality of graphical program nodes in the new graphical program; and
      automatically interconnecting the plurality of graphical program nodes in the new graphical program;
   wherein the interconnected plurality of graphical program nodes comprise at least a portion of the new graphical program; and
   wherein said automatically creating the new graphical program creates the new graphical program without any user input specifying the plurality of graphical program nodes or the interconnection of the plurality of graphical program nodes during said creating.

2. The method of claim 1, wherein the new graphical program comprises a diagram portion comprising the plurality of interconnected nodes and a user interface portion; and
   wherein said automatically creating the new graphical program comprises creating the diagram portion and the user interface portion.

3. The method of claim 1, wherein the new graphical program comprises a data flow diagram.

4. The method of claim 1, wherein the new graphical program is a virtual instrument.

5. The method of claim 1, wherein said executing the first program occurs in a first computing environment;
   wherein said first computing environment is connected to a second computing environment;
   wherein said executing the first program comprises sending information from the first computing environment to the second computing environment; and
   wherein the new graphical program is created in the second computing environment.

6. The method of claim 1,
   wherein the first program specifies creation of the new graphical program.

7. The method of claim 1, further comprising:
   receiving information from a user;
   wherein said automatically creating comprises automatically creating the new graphical program at least partially based on the information received from the user.

8. The method of claim 1,
wherein the first program comprises a client program that calls an application programming interface (API) to automatically create the new graphical program; and
wherein said executing comprises the first program calling the API to perform said creating and said interconnecting.

9. The method of claim 1,
wherein the first program comprises a server program; and
wherein said executing comprises the first program receiving calls from a client program.

10. The method of claim 1, wherein the new graphical program comprises a block diagram, and wherein the plurality of graphical program nodes comprise at least one function node placed in the block diagram.

11. The method of claim 1, wherein the new graphical program includes a block diagram, and wherein the plurality of graphical program nodes comprise at least one programmatic structure placed in the block diagram.

12. The method of claim 1, wherein the plurality of graphical program nodes comprise at least one graphical loop structure.

13. The method of claim 1, wherein the plurality of graphical program nodes comprise at least one graphical case structure.

14. The method of claim 1, wherein said interconnecting the plurality of graphical program nodes comprises displaying a connection between an input of a first graphical program node and an output of a second graphical program node.

15. The method of claim 1, wherein said automatically creating the new graphical program comprises:
automatically creating one or more user interface nodes, wherein the one or more user interface nodes perform one or more of providing input to or displaying output from the new graphical program.

16. The method of claim 1, wherein the new graphical program includes a user interface panel, and wherein plurality of graphical program nodes comprise at least one user interface node placed in the user interface panel.

17. The method of claim 16, wherein the user interface node comprises at least one of:
a user interface input node placed in the user interface panel for providing user input to the new graphical program; and/or
a user interface output node placed in the user interface panel for viewing output of the new graphical program.

18. The method of claim 1, wherein said automatically creating the new graphical program further comprises:
obtaining a reference to a graphical program node, wherein the reference is used to manipulate the graphical program node.

19. The method of claim 1, wherein said automatically creating the new graphical program further comprises:
performing at least one of getting or setting a property of a graphical program node.

20. The method of claim 1, wherein said automatically creating the new graphical program further comprises:
invoking a method on a graphical program node.

21. The method of claim 1, wherein the first program is a first graphical program.

22. The method of claim 21,
wherein the first graphical program includes a graphical program creation node for automatically creating the new graphical program;
wherein the first graphical program includes at least one object creation node for automatically creating at least one graphical program node in the new graphical program; and
wherein said executing the first graphical program includes:
executing the graphical program creation node, wherein said executing the graphical program creation node causes creation of the new graphical program; and
executing the object creation node, wherein said executing the object creation node causes inclusion of the graphical program node in the new graphical program.

23. The method of claim 21, wherein the first graphical program includes a graphical program creation node for automatically creating the new graphical program.

24. The method of claim 23, wherein said creating the first graphical program comprises:
displaying the graphical program creation node; and
specifying a new graphical program type for the graphical program creation node;
wherein said creating the new graphical program comprises creating the new graphical program of the specified new graphical program type.

25. The method of claim 24, wherein the graphical program creation node includes a type input; and
wherein said specifying a new graphical program type for the graphical program creation node comprises connecting type information to the type input of the graphical program creation node.

26. The method of claim 23, wherein said creating the first graphical program comprises:
displaying the graphical program creation node; and
specifying a reference to a server program for the graphical program creation node;
wherein said creating the new graphical program comprises the server program creating the new graphical program.

27. The method of claim 26, wherein the server program is an application instance of a graphical programming development environment.

28. The method of claim 26, wherein the graphical program creation node includes a server program reference input; and
wherein said specifying a reference to a server program for the graphical program creation node comprises connecting information specifying a server program to the server program reference input of the graphical program creation node.

29. The method of claim 26, wherein said executing the first graphical program is performed in a first computing system;
wherein said server program executes in a second computing system; and
wherein the first computing system is connected to the second computing system.

30. The method of claim 21, wherein said creating the first graphical program comprises:
displaying a graphical program creation node, wherein the graphical program creation node is operable to automatically create the new graphical program;
displaying an object creation node, wherein the object creation node is operable to automatically create at least one graphical program node in the new graphical program; and configuring the object creation node with one or more inputs.

31. The method of claim 30, further comprising:
connecting the graphical program creation node to the object creation node;
wherein the graphical program creation node outputs a reference to the new graphical program; and
wherein said connecting the graphical program creation node to the object creation node comprises connecting the reference to the new graphical program to an input of the object creation node.

32. The method of claim 30, further comprising configuring the graphical program creation node with one or more inputs, wherein said configuring the graphical program creation node with one or more inputs comprises performing one or more of:
1) specifying a new graphical program type for the graphical program creation node; and 2) specifying a server reference for the graphical program creation node.

33. The method of claim 32, wherein a server reference is specified for the graphical program creation node;
wherein said executing the first graphical program comprises executing program instructions on a first computer;
wherein the server reference references a server program running on a second computer;
wherein the second computer is connected to the first computer via a network; and
wherein said creating the new graphical program in response to said executing the first graphical program comprises the server program creating the new graphical program.

34. The method of claim 30, wherein said configuring the object creation node with one or more inputs comprises performing one or more of:
1) specifying a node class for the object creation node; 2) specifying a node sub-class for the object creation node; 3) specifying position information to the object creation node; and 4) specifying owner reference information for the object creation node.

35. The method of claim 21, wherein the first graphical program includes a plurality of object creation nodes each for automatically creating a graphical program node in the new graphical program, wherein said plurality of object creation nodes includes a first object creation node for creating a first graphical program node in the new graphical program and includes a second object creation node for creating a second graphical program node in the new graphical program;
wherein said executing the first graphical program comprises including the first graphical program node and the second graphical program node in the new graphical program;
wherein the first graphical program further includes a node operable to connect the first graphical program node to the second graphical program node; and
wherein said executing the first graphical program includes connecting the first graphical program node to the second graphical program node.

36. The method of claim 21, wherein the first graphical program includes at least one object creation node for automatically creating at least one graphical program node in the new graphical program; and
wherein said automatically creating the new graphical program comprises including the at least one graphical program node in the new graphical program.

37. The method of claim 36, wherein the first graphical program further includes a property node; and
wherein said automatically creating the new graphical program comprises the property node getting or setting a property of the graphical program node.

38. The method of claim 37, wherein the object creation node outputs a reference to the graphical program node;
wherein the property node receives as input the reference to the graphical program node; and
wherein the property node gets or sets a property of the graphical program node specified by the reference to the graphical program node.

39. The method of claim 36, wherein the first graphical program further includes an invoke node; and
wherein said automatically creating the new graphical program comprises the invoke node invoking a method on the graphical program node.

40. The method of claim 39, wherein the object creation node outputs a reference to the graphical program node;
wherein the invoke node receives as input the reference to the graphical program node; and
wherein the invoke node invokes a method on the graphical program node specified by the reference to the graphical program node.

41. The method of claim 39, wherein the invoked method connects the graphical program node to another graphical program node in the new graphical program.

42. The method of claim 41, wherein said connecting the graphical program node to said another graphical program node comprises connecting an input of the graphical program node to an output of said another graphical program node.

43. The method of claim 39, wherein the invoked method performs one of 1) moving the graphical program node to another location in the new graphical program; and 2) resizing the graphical program node in the new graphical program.

44. The method of claim 36, wherein said creating the first graphical program comprises:
displaying the object creation node; and
specifying a graphical program node class for the object creation node;
wherein the at least one graphical program node included in the new graphical program is of the graphical program node class.

45. The method of claim 44, wherein said creating the first graphical program further comprises:
specifying a graphical program node sub-class for the object creation node;
wherein the graphical program node included in the new graphical program is of the node sub-class.

46. The method of claim 36, wherein said creating the first graphical program comprises:
displaying the object creation node; and
specifying position information to the object creation node;
wherein the at least one graphical program node included in the new graphical program is positioned in the new graphical program at a location based on the position information.

47. The method of claim 36, wherein said creating the first graphical program comprises:
displaying the object creation node; and
specifying owner reference information for the object creation node, wherein the owner reference information designates an owner entity;

wherein the at least one graphical program node is included in the new graphical program as a member of the owner entity.

48. The method of claim 47, wherein the owner entity is an entity from the group consisting of: 1) the new graphical program; and 2) another graphical program node of the new graphical program.

49. A memory medium, comprising:
a first program, wherein the first program is operable to automatically create a new graphical program based on received information;
wherein the first program comprises program instructions that are operable to:
create a plurality of graphical program nodes in the new graphical program; and
interconnect the plurality of graphical program nodes in the new graphical program;
wherein the interconnected plurality of graphical program nodes comprise at least a portion of the new graphical program; and
wherein the first program is operable to automatically create the new graphical program without any user input specifying selection of graphical program nodes and interconnection of graphical program nodes.

50. The memory medium of claim 49, wherein the new graphical program comprises a diagram portion comprising the plurality of interconnected nodes and a user interface portion; and
wherein the first program is operable to automatically create the diagram portion and the user interface portion.

51. The memory medium of claim 49, wherein the new graphical program comprises a data flow diagram.

52. The memory medium of claim 49, wherein the new graphical program is a virtual instrument.

53. The memory medium of claim 49, wherein the first program is operable to execute in a first computing environment;
wherein said first computing environment is connected to a second computing environment;
wherein during execution the first program is operable to send information from the first computing environment to the second computing environment; and
wherein the new graphical program is created in the second computing environment.

54. The memory medium of claim 49
wherein the first program specifies creation of the new graphical program.

55. The memory medium of claim 49,
wherein the first program is operable to receive information from a user and automatically create the new graphical program at least partially based on the information received from the user.

56. The memory medium of claim 49,
wherein the first program comprises a client program that calls an application programming interface (API) to automatically create the new graphical program; and
wherein during execution the first program is operable to call the API to perform said creating and said interconnecting.

57. The memory medium of claim 49,
wherein the first program comprises a server program; and
wherein during execution the first program is operable to receive calls from a client program.

58. The memory medium of claim 49, wherein the new graphical program comprises a block diagram, and wherein the plurality of graphical program nodes comprise at least one function node placed in the block diagram.

59. The memory medium of claim 49, wherein the new graphical program includes a block diagram, and wherein the plurality of graphical program nodes comprise at least one programmatic structure placed in the block diagram.

60. The memory medium of claim 49, wherein the plurality of graphical program nodes comprise at least one graphical loop structure.

61. The memory medium of claim 49, wherein the plurality of graphical program nodes comprise at least one graphical case structure.

62. The memory medium of claim 49, wherein, in interconnecting the plurality of graphical program nodes, the program instructions are operable to display a connection between an input of a first graphical program node and an output of a second graphical program node.

63. The memory medium of claim 49, wherein the program instructions are further operable to:
create one or more user interface nodes, wherein the one or more user interface nodes perform one or more of providing input to or displaying output from the new graphical program.

64. The memory medium of claim 49, wherein the new graphical program includes a user interface panel, and wherein plurality of graphical program nodes comprise at least one user interface node placed in the user interface panel.

65. The memory medium of claim 64, wherein the user interface node comprises at least one of:
a user interface input node placed in the user interface panel for providing user input to the new graphical program; and/or
a user interface output node placed in the user interface panel for viewing output of the new graphical program.

66. The memory medium of claim 49, wherein the program instructions are further operable to:
obtain a reference to a graphical program node, wherein the reference is used to manipulate the graphical program node.

67. The memory medium of claim 49, wherein the program instructions are further operable to:
perform at least one of getting or setting a property of a graphical program node.

68. The memory medium of claim 49, wherein the program instructions are further operable to:
invoke a method on a graphical program node.

69. A memory medium, comprising:
a first graphical program, wherein the first graphical program includes a graphical program creation node for automatically instantiating a new graphical program, wherein the first graphical program also includes a first object creation node for creating a first node in the new graphical program and includes a second object creation node for creating a second node in the new graphical program;
wherein the first graphical program is executable to:
instantiate the new graphical program;
include the first node and the second node in the new graphical program; and
connect the first node to the second node; and
wherein the first graphical program is operable to automatically create the new graphical program without any user input specifying selection of graphical program nodes and interconnection of graphical program nodes.

37

70. The memory medium of claim 69, wherein the first graphical program also includes a node for obtaining a graphical program node reference;
  wherein the reference to the existing graphical program is provided to the node for obtaining a graphical program node reference;
  wherein the node for obtaining a graphical program node reference is configured to obtain a reference to a particular node of the existing graphical program;
  wherein the first graphical program includes a modify node;
  wherein the reference to the particular node of the existing graphical program is provided to the modify node; and
  wherein the modify node is configured to modify the particular node of the existing graphical program.

71. A computer-implemented method for automatically creating a graphical program, comprising:
  storing a first program, wherein the first program includes a graphical program creation function for automatically instantiating a new graphical program, wherein the first program also includes an object creation function for automatically including a node in the new graphical program; and
  executing the first program, wherein said executing comprises:
    automatically instantiating the new graphical program;
    automatically including the node in the new graphical program; and
    automatically connecting the node to at least one other node in the new graphical program;
  wherein the first program is operable to automatically create the new graphical program without any user input specifying selection of graphical program nodes and interconnection of graphical program nodes.

72. The method of claim 71, wherein the first program is a graphical program;
  wherein the graphical program creation function comprises a graphical program creation node; and
  wherein the object creation function comprises an object creation node.

73. The method of claim 71, wherein the first program is a text-based program.

74. The method of claim 73, wherein the graphical program creation function comprises a method call to create the new graphical program; and
  wherein the object creation function comprises a method call to create the node.

75. The method of claim 73, wherein the text-based program obtains a reference to a software component;
  wherein the software component enables the text-based program to perform the method call to create the new graphical program; and
  wherein the software component enables the text-based program to perform the method call to create the node.

76. The method of claim 75, wherein the software component interfaces with a server program;
  wherein the server program receives the method call to create the new graphical program;
  wherein the server program creates the new graphical program;
  wherein the server program receives the method call to create the node; and
  wherein the server program creates the node.

77. The method of claim 75, wherein the software component is an ActiveX component.

38

78. A system for automatically creating a graphical program, comprising:
  a computer system including a CPU and memory;
  wherein the memory stores a first program, wherein the first program specifies creation of a new graphical program, wherein the first program is executable to automatically create the new graphical program;
  wherein the CPU is operable to execute the first program to automatically create the new graphical program, wherein, in executing the first program, the CPU is operable to:
    create a plurality of graphical program nodes in the new graphical program; and
    interconnect the plurality of graphical program nodes in the new graphical program;
  wherein the interconnected plurality of graphical program nodes comprise at least a portion of the new graphical program; and
  wherein the first program is operable to automatically create the new graphical program without any user input specifying selection of graphical program nodes and interconnection of graphical program nodes.

79. The system of claim 78, wherein, in response to said CPU executing the first program, the first program is operable to interface with a server program; and
  wherein the server program is operable to automatically create the new graphical program in response to said interfacing.

80. The system of claim 79, wherein the server program is an application instance of a graphical programming development environment.

81. The system of claim 79, wherein said computer system is a first computer system, the system further comprising:
  a second computer system;
  wherein the server program executes in the second computer system; and
  wherein the first computer system is connected to the second computer system via a network.

82. The system of claim 78,
  wherein at least one of the plurality of graphical program nodes comprises a structure node.

83. The system of claim 78, wherein the first program is a first graphical program.

84. The system of claim 83, wherein the first graphical program includes at least one object creation node for automatically creating at least one graphical program node in the new graphical program; and
  wherein said creating the new graphical program comprises including the at least one graphical program node in the new graphical program in response to said executing the first graphical program.

85. The system of claim 83, wherein the first graphical program includes a graphical program creation node for automatically instantiating the new graphical program.

86. A system for automatically creating a graphical program, comprising:
  a computer system including a CPU and memory;
  a client program executing in the computer system, wherein the client program performs API calls to automatically create a graphical program based on received information; and
  a server program operable to receive the client program calls to automatically create the graphical program based on the received information, wherein, in automatically creating the graphical program, the server program is executable to:
- automatically create a plurality of graphical program nodes in the new graphical program; and
- automatically interconnect the plurality of graphical program nodes in the new graphical program, wherein the interconnected plurality of graphical program nodes comprise at least a portion of the new graphical program;
- wherein the server program is operable to automatically create the new graphical program without any user input specifying selection of graphical program nodes and interconnection of graphical program nodes.

87. The system of claim 86, wherein the server program executes on another computer system, and wherein said another computer system is connected to said computer system via a network.

88. The system of claim 86,
- wherein the client program performs said calls to automatically create a graphical program by obtaining a reference to a software component and invoking methods of the software component; and
- wherein the software component is operable to perform the operations of automatically creating the graphical program.

89. The system of claim 86,
- wherein the client program performs said calls to automatically create a graphical program by obtaining a reference to a software component and invoking methods of the software component; and
- wherein the software component relays the client program calls to the server program.

90. The system of claim 86, wherein the server program is a graphical programming environment application.

91. The system of claim 86, wherein the client program is a client graphical program;
- wherein the client graphical program includes a graphical program creation node for automatically instantiating a new graphical program;
- wherein the client graphical program also includes an object creation node for automatically creating a graphical program node in the new graphical program; and
- wherein said API calls to automatically create a graphical program comprise calls resulting from executing the graphical program creation node and the object creation node.

92. The system of claim 91, wherein the client graphical program further includes a property node for getting or setting a property of the graphical program node.

93. The system of claim 91, wherein the client graphical program further includes an invoke node for invoking a method on the graphical program node.

94. The system of claim 93, wherein the object creation node is a first object creation node for automatically creating a first graphical program node in the new graphical program;
- wherein the graphical program also includes a second object creation node for automatically creating a second graphical program node in the new graphical program; and
- wherein the invoked method connects the first graphical program node to the second graphical program node.

95. A memory medium comprising a client program for automatically creating a new graphical program, wherein the client program comprises:
- a means for automatically instantiating the new graphical program;
- a means for automatically creating a node in the new graphical program;
- a means for getting or setting properties of the new graphical program or the node; and
- a means for automatically invoking methods on the new graphical program or the node;
- wherein said means for automatically instantiating the new graphical program are operable to automatically instantiate the new graphical program without any user input specifying instantiation of the new graphical program;
- wherein said means for automatically creating the node in the new graphical program are operable to automatically create the node in the new graphical program without any user input specifying creation of the node in the graphical program; and
- wherein said means for automatically invoking methods on the new graphical program or the node are operable to automatically invoke methods on the new graphical program or the node without any user input specifying invocation of methods on the new graphical program or the node.

96. The memory medium of claim 95, wherein the client program is a graphical program;
- wherein said means for automatically instantiating the new graphical program comprises a graphical program creation node;
- wherein said means for automatically creating a node in the new graphical program comprises an object creation node;
- wherein said means for getting or setting properties of the new graphical program or the node comprises a property node; and
- wherein said means for automatically invoking methods on the new graphical program or the node comprises an invoke node.

97. A computer-implemented method for automatically creating a graphical program, comprising:
- storing a first graphical program, wherein the first graphical program includes a graphical program creation node for automatically instantiating a new graphical program, wherein the first graphical program also includes at least one object creation node for automatically creating at least one graphical program node in the new graphical program;
- executing the first graphical program, wherein said executing comprises:
  - automatically instantiating the new graphical program; and
  - automatically including the node in the new graphical program;
- wherein said first graphical program automatically creating the new graphical program comprises automatically creating the new graphical program without any user input specifying selection of graphical program nodes and interconnection of graphical program nodes; and
- wherein said automatically including the node in the new graphical program comprises automatically including the node in the new graphical program without any user input specifying inclusion of the node in the new graphical program.

* * * * *